(12) United States Patent
Hardman

(10) Patent No.: US 9,983,330 B2
(45) Date of Patent: May 29, 2018

(54) METHODS FOR PRODUCING A LOG OF MATERIAL PROPERTIES

(71) Applicant: Richard H. Hardman, Houston, TX (US)

(72) Inventor: Richard H. Hardman, Houston, TX (US)

(*) Notice: Subject to any disclaimer, the term of this patent is extended or adjusted under 35 U.S.C. 154(b) by 9 days.

(21) Appl. No.: 14/697,249

(22) Filed: Apr. 27, 2015

(65) Prior Publication Data

US 2015/0226873 A1 Aug. 13, 2015

Related U.S. Application Data

(63) Continuation of application No. 12/937,311, filed as application No. PCT/US2009/040704 on Apr. 15, 2009, now Pat. No. 9,250,352.

(60) Provisional application No. 61/124,594, filed on Apr. 17, 2008, provisional application No. 61/054,881, filed on May 21, 2008, provisional application No. 61/206,584, filed on Feb. 2, 2009.

(51) Int. Cl.
*G01V 3/38* (2006.01)
*G01V 3/26* (2006.01)

(52) U.S. Cl.
CPC . *G01V 3/38* (2013.01); *G01V 3/26* (2013.01)

(58) Field of Classification Search
None
See application file for complete search history.

(56) References Cited

U.S. PATENT DOCUMENTS 9,250,352 B2 * 2/2016 Hardman ............... G01V 3/38
2004/0100263 A1 * 5/2004 Fanini ................... G01V 3/28
                                                                324/339

OTHER PUBLICATIONS

Steven M. Shope, Electromagnetic Surface Fields Due to a Magnetic Dipole Buried in a Three-Layered Earth, Bureau of Mines Report of Investigations/I982, 26 pages.*

* cited by examiner

*Primary Examiner* — Tung Lau
(74) *Attorney, Agent, or Firm* — Marc P. Schuyler

(57) ABSTRACT

A method for making a log of material properties in a plurality of beds from an instrument utilizes steps such as estimating material properties for said plurality of beds and/or estimating positions for a plurality of bed boundaries and/or estimating orientations for said plurality of bed boundaries wherein the bed boundary orientations are individually variable. The estimated positions, orientations, and/or material properties can be utilized to compute the log.

27 Claims, 13 Drawing Sheets

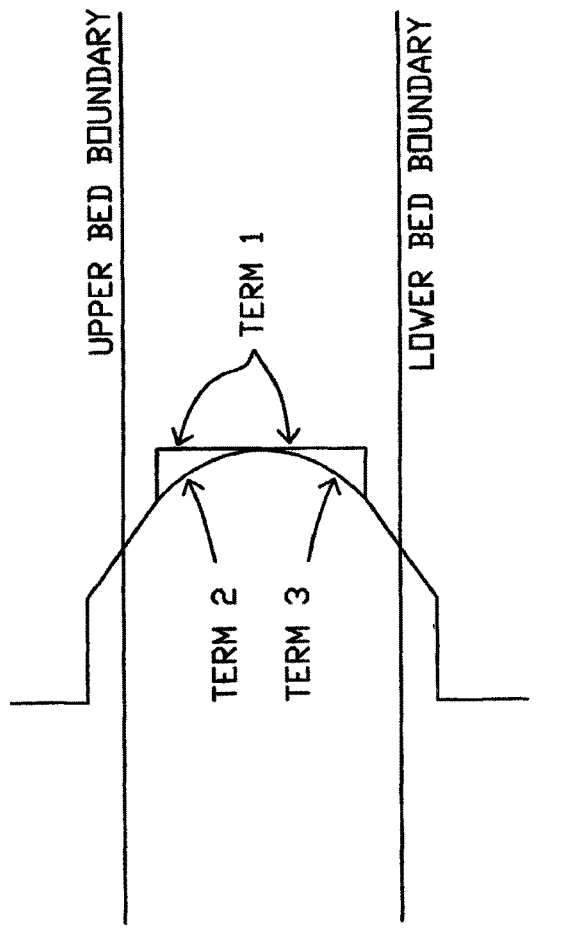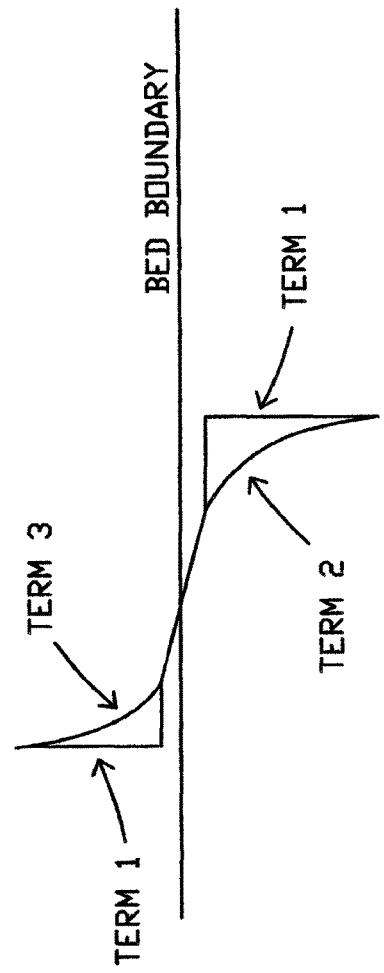
FIG. 5
FIG. 6

METHODS FOR PRODUCING A LOG OF MATERIAL PROPERTIES

This application is a continuation of U.S. Utility patent application Ser. No. 12/937,311, filed Oct. 11, 2010, which is a national stage entry under 35 USC § 371 of Patent Cooperation Treaty Application No. PCT/US2009/040704, filed Apr. 17, 2008. PCT Application No. PCT/US2009040704 claims benefit of U.S. Provisional Application 61/124,594 filed Apr. 17, 2008, U.S. Provisional Application 61/054,881 filed May 21, 2008, and U.S. Provisional Application 61/206,584 filed Feb. 2, 2009. Each of the aforementioned patent applications are hereby incorporated by reference.

BACKGROUND OF THE INVENTION

1. Field of the Invention

The present invention relates generally to the field of logging of material properties and, in one possible specific embodiment, relates to methods and/or devices for making a log in layered environments. One possible non-limiting example includes producing a log of material properties with respect to borehole depth.

2. Description of the Background

Subsurface geological formations typically comprise layers of various types of formations. While the present invention is not limited to use in producing logs of a layered environment comprising subsurface geological formations, an embodiment of the invention is conveniently described in terms of this environment.

Most oil and gas was originally deposited in an ocean environment. As a consequence, such formations may contain fluids such as salt water and/or oil. Salt water, with its mobile sodium and chlorine ions makes the formation conductive to electricity, while the oil/gas makes the formation resistive. The oil companies typically utilize logging tools to produce a log of material properties of a wellbore. As one example, when the desired rock formation or depth is reached, the drill pipe and the bit are removed from the hole. An instrument is lowered into the wellbore to measure the electrical conductivity versus depth. In this way, a log or a record of the geologic formation is produced. Other instruments may generate a log of a wellbore while drilling. Generally, if the rocks are relatively conductive, they contain salt water. If the rocks are relatively resistive, they contain oil and/or gas.

The earliest instruments used direct current and were first used in 1927. In the 1950's, electromagnetic or induction tools were introduced. These electromagnetic instruments had coaxial coils, and measured just one component of the conductivity tensor of the rock. There are many different electromagnetic tools which measure various physical quantities. The standard induction tools measure a voltage while the measurement-while-drilling (MWD) tools measure phase differences and/or amplitude ratios. Other tools comprise many configurations such as laterolog tools, normal and lateral tools, e-log tools and the like. The present invention may be utilized with these and other tools.

Oil is often deposited in a layered environment. There is an exact mathematical solution to an electromagnetic instrument penetrating a parallel layered environment at any angle as per an article by the inventor. See, for example, Hardman and Shen, "Theory of Induction Sonde in Dipping Beds," Geophysics Vol. 51, No. 3, March 1986, p. 800-809. However, in the real world, the interface between the layers is not necessarily parallel.

Other background material may include Hardman and Shen, "Charts for Correcting Effects of Formation Dip and Hole Deviation on Induction Logs," The Log Analyst, Vol. 28, No. 4, p 349-356, July-August 1987; Hardman, "Four-Term Decomposition Techniques for a Faster Inversion of Induction Responses," SPE 84606, October 2003; Wang, Barber, et al., "Triaxial Induction Logging; Theory, Modeling, Inversion, and Induction," SPE 103897, December 2006; Anderson, Barbara et al., "Effect of Dipping Beds on the Response of Induction Tools", SPE Formation Evaluation (March 1988), pp. 29-36; Barber, Anderson, et al, "Determining Formation Resistivity Anisotropy in the Presence of Invasion, SPE 90526, September 2004; Anderson, Barbara et al., "Response of 2-MHZ LWD Resistivity and Wireline Induction Tools in Dipping Beds and Laminated Formations", SPWLA 31st Annual Logging Symposium, Jun. 24-27, 1990, Paper A, pp. 1-25; Barber, Thomas D. et al., "Interpretation of Multiarray Induction Logs in Invaded Formations at High Relative Dip Angles", The Log Analyst, vol. 40, No. 3 (May-June 1999), pp. 202-21; Sommerfeld Partial Differential Equations in Physics, Academic Press 1949; U.S. Pat. No. 3,808,520; U.S. Pat. No. 6,304,086; U.S. Pat. No. 6,573,722; U.S. Pat. No. 6,216,089; U.S. Pat. No. 3,510,757; US 2006/0038571; US 2007/0256832; US 2003/0222651; US 2003/0146753; US 2003/0155924; US 2005/0127917; US 2004/0017197; US 2006/0192562; US 2003/0146751; US 2009/0018775; US 2008/0078580; US 2008/0210420; US 2008/0215241; US 2008/0258733; US 2008/0078580; US 2008/0278169; and US 2005/0256642.

Since around 2000, the tools have transmitter and receiver coils in the x, y and z directions. These tri-axial instruments measure all the components of the conductivity tensor and are able to orient the individual bed boundaries. A change in bed boundary orientation may be indicative of a change in the depositional environment. Information concerning the orientation of the bed boundary may be very useful in the geologic interpretation of the formation.

Consequently, there remains a long felt need for improved methods which may be utilized to produce more accurate logs in layered environments wherein the layers may or may not be parallel. Moreover, it sometimes desirable to more quickly calculate or invert logs. Because those skilled in the art have recognized and attempted to solve these problems in the past, they will appreciate the present invention, which addresses these and other problems.

SUMMARY OF THE INVENTION

An object of the invention is to provide an improved method of logging physical properties.

Another possible object of the present invention is to provide a faster method of computing and inverting a log.

Another possible object of the present invention is provide the ability to compute the log when any boundary has an individually variable orientation whereby the bed boundary effects are accurately accounted for in the log. (FIG. 1)

Another possible object of the invention is to provide improved accuracy of the positions and/or orientations of bed boundaries and/or the material properties of the beds.

Another possible object of the invention is to provide an improved method for geosteering a well.

Another possible object of a specific embodiment of the present invention is to determine a conductivity log from the composite magnetic field.

These and other objects, features, and advantages of the present invention will become apparent from the drawings, the descriptions given herein, and the appended claims.

However, it will be understood that the above-listed objectives and/or advantages of the invention are intended only as an aid in understanding aspects of the invention, are not intended to limit the invention in any way, and therefore do not form a comprehensive or restrictive list of objectives, and/or features, and/or advantages.

Accordingly, the present invention comprises a method for making a log of material properties in a plurality of beds from an instrument which produces an electromagnetic field. (See FIG. 11) In one embodiment, the invention may comprise steps such as, for example, estimating material properties for the plurality of beds and/or estimating positions for a plurality of bed boundaries and/or estimating orientations for the plurality of bed boundaries wherein the bed boundary orientations are individually variable. Other steps may comprise utilizing the positions, and/or the orientations, and/or the material properties to compute the log. (See FIG. 1)

In one possible embodiment, an inversion process can be utilized to invert the log.

In one embodiment, the method may comprise varying the orientation for a selected one of a plurality of bed boundaries and utilizing the resulting orientations of the bed boundaries and/or the positions and/or the material properties of the beds to compute the log. The method may comprise varying a position for the selected bed boundary and utilizing the resulting positions of the bed boundaries and/or the orientations and/or the material properties to compute the log. The method may also comprise varying the material properties for a selected bed and utilizing the resulting material properties and/or positions and/or the orientations of the bed boundaries to compute the log.

In one embodiment, the method may comprise selecting a bed boundary from the plurality of bed boundaries, computing a transverse magnetic term one, and utilizing the transverse magnetic term one to compute the log. (See FIG. 6) The method may also comprise computing a transverse magnetic term two and a transverse magnetic term three and/or a transverse magnetic term four for the bed boundary and utilizing the transverse magnetic term one and/or the transverse magnetic term two and the transverse magnetic term three and/or the transverse magnetic term four to compute the log.

In one possible embodiment, the method may comprise selecting a bed from the plurality of beds wherein the bed has an upper bed boundary and a lower bed boundary (See FIG. 5), computing a first transverse magnetic term one for the upper bed boundary, computing a second transverse magnetic term one for the lower bed boundary, combining the first transverse magnetic term one and the second transverse magnetic term one to provide a combined transverse magnetic term one. (See FIG. 9) Other steps may comprise utilizing the combined transverse magnetic term one to compute the log. The method may also comprise computing a transverse magnetic term two for the upper bed boundary, computing a transverse magnetic term three for the lower bed boundary, and utilizing the combined transverse magnetic term one, the transverse magnetic term two, and the transverse magnetic term three to compute the log. (See FIG. 8)

In another embodiment, the method may comprise selecting a bed boundary from the plurality of bed boundaries, computing a transverse electric term one, and utilizing the transverse electric term one to compute the log. The method may comprise computing a transverse electric term two and a transverse electric term three for the bed boundary and/or utilizing the transverse electric term one and/or the transverse electric term two and the transverse electric term three to compute the log.

In another embodiment, the method may comprise selecting a bed from the plurality of beds wherein the bed has an upper bed boundary and a lower bed boundary, computing a first transverse electric term one for the upper bed boundary, computing a second transverse electric term one for the lower bed boundary, and combining the first transverse electric term one and the second transverse electric term one to provide a combined transverse electric term one. (See FIG. 9) The method may utilize the combined transverse electric term one to compute the log. The method may further comprise computing a transverse electric term two for the upper bed boundary, computing a transverse electric term three for the lower bed boundary, and utilizing the combined transverse electric term one, the transverse electric term two, and the transverse electric term three to compute the log. (See FIG. 8)

In yet another embodiment, the method may comprise selecting a bed boundary from the plurality of bed boundaries, computing a transverse electric up for the bed boundary and computing a transverse electric down for the bed boundary. (See FIG. 10) The method may comprise utilizing the transverse electric up and the transverse electric down to compute the log. The method may also comprise computing a transverse magnetic term one and utilizing the transverse magnetic term one, the transverse electric up, and the transverse electric down to compute the log. The method may comprise computing a transverse magnetic term one, a transverse magnetic term two, and a transverse magnetic term three for the bed boundary, and utilizing the transverse magnetic term one, the transverse magnetic term two, the transverse magnetic term three, the transverse electric up, and the transverse electric down to compute the log.

In another embodiment, the method of claim 1 may comprise selecting a bed from the plurality of beds wherein the bed has an upper bed boundary and a lower bed boundary (See FIG. 10), computing a transverse electric down for the upper bed boundary and computing a transverse electric up for the lower bed boundary. The method may utilize the transverse electric down and the transverse electric up to compute the log. The method may also comprise computing a first transverse magnetic term one for the upper bed boundary, computing a second transverse magnetic term one for the lower bed boundary, combining the first transverse magnetic term one and the second transverse magnetic term one to provide a combined transverse magnetic term one, and utilizing the combined transverse magnetic term one, the transverse electric up, and the transverse electric down to compute the log. The method may also comprise computing a first transverse magnetic term one for the upper bed boundary, computing a second transverse magnetic term one for the lower bed boundary, combining the first transverse magnetic term one and the second transverse magnetic term one to provide a combined transverse magnetic term one, computing a transverse magnetic term two for the upper bed boundary, computing a transverse magnetic term three for the lower bed boundary, and utilizing the combined transverse magnetic term one (See FIG. 9), the transverse magnetic term two, the transverse magnetic term three, the transverse electric up and the transverse electric down to compute the log. (See FIG. 10)

In another embodiment, the method may comprise computing a first and/or a new transverse electric up for the bed boundary, computing a first and/or a new transverse electric down for the bed boundary and utilizing the transverse magnetic term one, the transverse electric up and the transverse electric down to compute the log.

In another embodiment, the method may comprise computing a first and/or a new transverse electric up for the bed boundary, computing a first and/or a new transverse electric down for the bed boundary, and utilizing the transverse magnetic term one, the transverse magnetic term two, the transverse magnetic term three, the first and/or new transverse electric up and/or the first and/or new transverse electric down to compute the log.

In another embodiment, the method may comprise computing a first and/or new transverse electric down for the upper bed boundary, computing a first and/or new transverse electric up for the lower bed boundary, utilizing the combined transverse magnetic term one, the first and/or new transverse electric down and/or the first and/or transverse electric up to compute the log.

In another embodiment, the method may comprise computing a first and/or new transverse electric down for the upper bed boundary, computing a first and/or new transverse electric up for the lower bed boundary and/or utilizing the combined transverse magnetic term one, the transverse magnetic term two, the transverse magnetic term three, and/or the first and/or new transverse electric down and the first and/or new transverse electric up to compute the log.

In yet another embodiment, the method may comprise determining a change in a transverse electric part to estimate bed material property derivatives for the plurality of beds (See FIG. 12), and/or estimating new material properties for the plurality of beds using the bed material property derivatives for the plurality of beds. If desired, the above steps can be iterated until a convergence criteria is reached. A change in a constant related to the material property in the transverse electric part can be utilized for determining the bed material derivatives. In one embodiment, the constant can be described utilizing $k^2$, where $k^2$ is $\omega^2\mu\varepsilon$.

The transverse electric part may comprise an upper bed boundary term and a lower bed boundary term for each of the plurality of beds. The transverse electric part can be a transverse electric part of a dipole. The dipole can comprise a vertical dipole component and/or a horizontal dipole component. (See FIG. 7)

The invention provides improved accuracy because the plurality of bed boundaries may or may not comprise non-parallel bed boundaries.

In one embodiment, the method may comprise a method geo-steering the instrument relative to a first bed boundary. The method may comprise determining an orientation between the instrument and the first bed boundary. The method may also comprise determining a relative position between the instrument and the first bed boundary.

The method may comprise estimating apparent dip angles for the plurality of bed boundaries. Another advantageous feature of the present invention is that the estimation of the apparent dip angles includes the possibility that the apparent dip angle calculations include the possibility the dip angle is changing within the bed rather than assuming the dip angle is constant within a bed.

In another embodiment, a method for determining a conductivity log may comprise determining a composite magnetic field at a receiver of an instrument and generally determining the conductivity log from the composite magnetic field. As noted above, the method may comprise determining a relative position between the instrument and a bed boundary and/or determining a relative angle between the instrument and a bed boundary.

In another embodiment, a method is provided for making a log of material properties in a plurality of beds from an instrument which produces an electromagnetic field. The method may comprise estimating a first material property for the plurality of beds and/or estimating a first orientation and/or a first position for a plurality of bed boundaries. Additional steps may call for utilizing the first orientation and/or the first position and/or first material property to compute the log. Additional steps may comprise comparing the so-computed log with a measured log from the instrument. The method may further comprise iteratively varying at least one of the first material property, the first orientation, and/or the first position for at least one of the plurality of bed boundaries and/or beds and subsequently comparing until the log is within a convergence criteria of the measured log.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 5 is a plot of a term 1, term 2, and term 3 shown with respect to depth relative to upper and lower bed boundaries in accord with one possible embodiment of the present invention.

FIG. 6 is a plot of a term 1, term 2, and term 3 shown with respect to depth relative to a bed boundary in accord with one possible embodiment of the present invention.

DESCRIPTION OF PRESENTLY PREFERRED EMBODIMENTS

Figure 1:
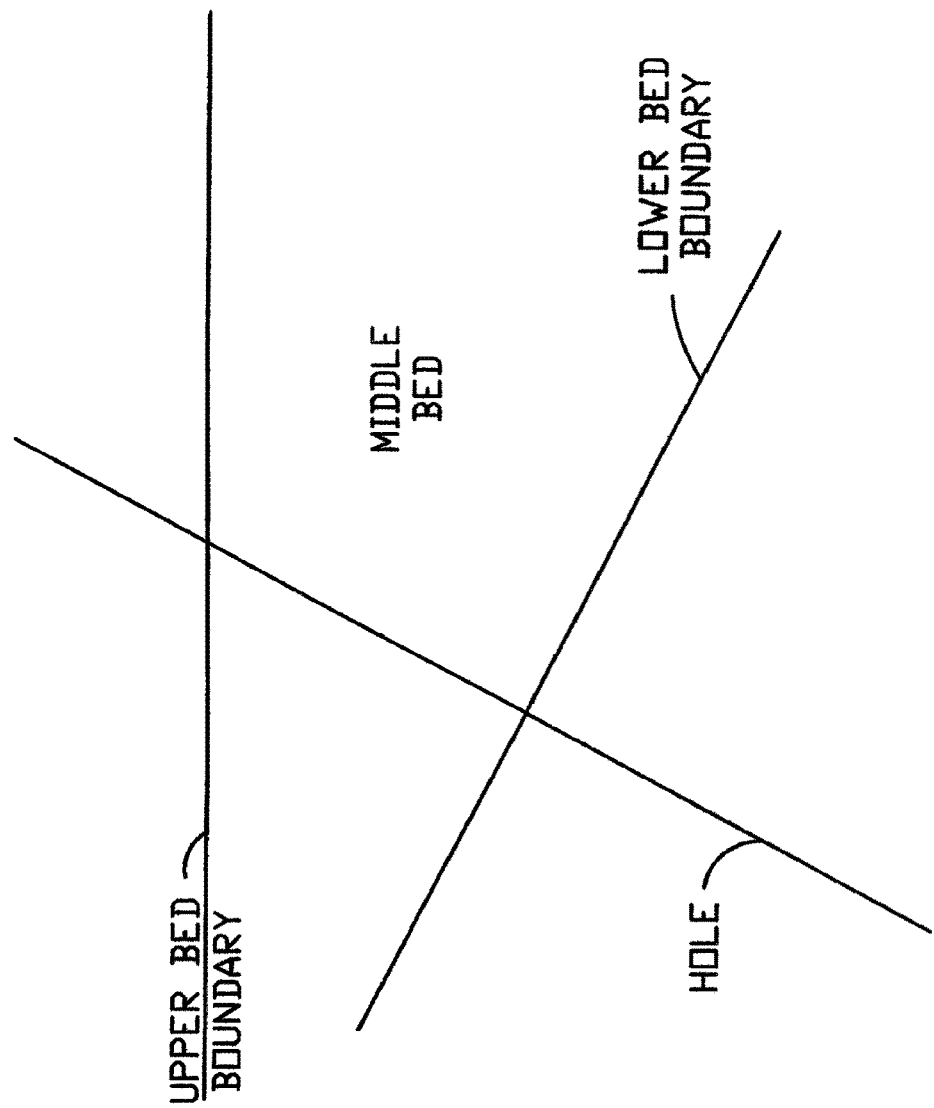
FIG. 1 is a simplified elevational view, in cross section, of an environment with a wellbore which extends through non-parallel bed boundaries in accord with one possible embodiment of the present invention.

In approximating the effect of a tool crossing non-parallel bed boundaries, one embodiment of the present invention divides the problem into a series of the tool crossings of individual bed boundaries while maintaining the angle of the tool relative to each bed boundary. Referring now to the drawings and more particularly to FIG. 1, in this example, a tool moving through the hole or wellbore enters the middle bed at one angle and leaves at another because the upper and lower bed boundaries are non-parallel. The present invention is also operable of changing the angle of the tool within a bed and/or as the tool approaches or leaves a bed boundary. The effects of a change in angle of the tool may typically be more pronounced near the bed boundaries. In FIG. 1, the hole is assumed to be straight, but need not be.

Figure 2:
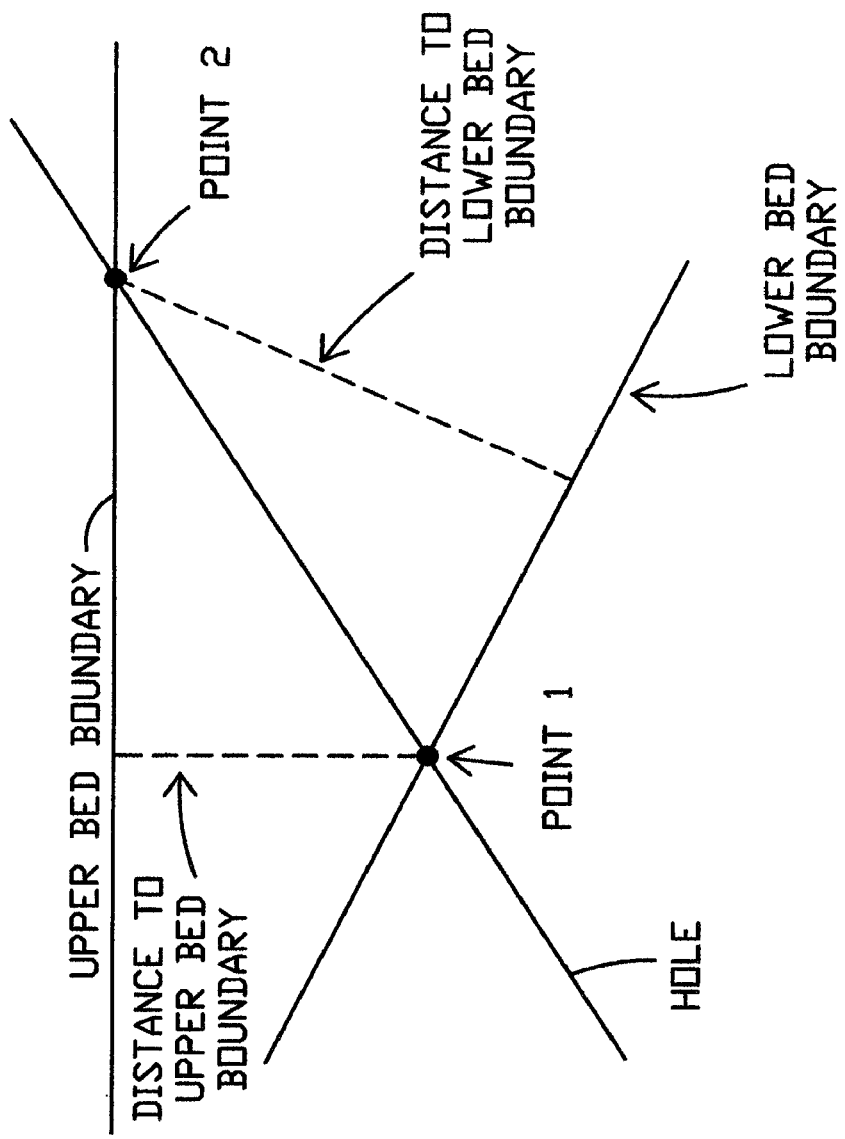
FIG. 2 is a simplified elevational view, in cross section, of an environment with a wellbore wherein a distance between non-parallel bed boundaries at the wellbore intersections to the bed boundaries is shown in accord with one possible embodiment of the present invention.

Referring to FIG. 2, when the tool is at the lower bed boundary, or point 1, a distance to the upper bed boundary may preferably be described by a line drawn perpendicular to the upper bed boundary. When the tool is at the upper bed boundary, or point 2, the distance to the lower bed boundary may preferably be described as a line drawn perpendicular to the lower bed boundary. In this example, the apparent thickness of the middle bed increases as the tool moves up hole. This makes real world sense because the bed thickness is increasing to the right, referring to FIG. 2. In order to incorporate this aspect into one possible method of the present invention, it is desirable to have the thickness of the middle bed increase as the tool moves up hole, as discussed hereinafter.

Figure 3:
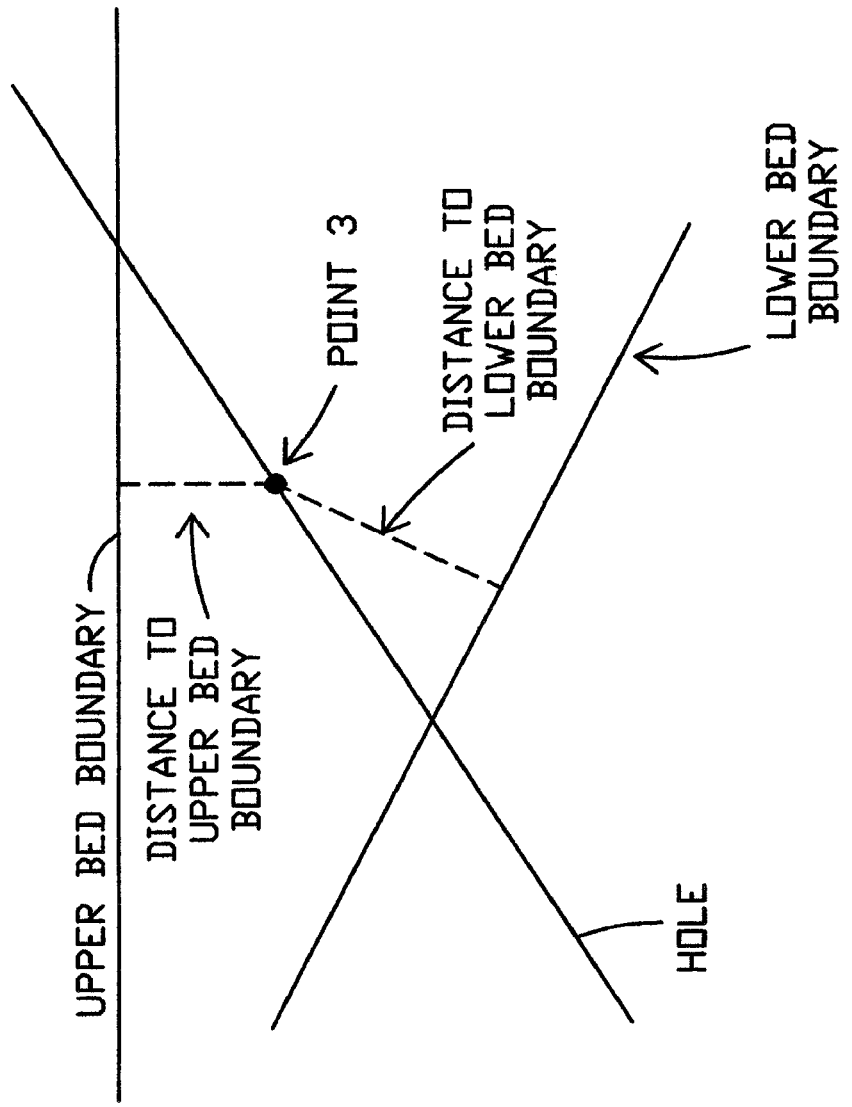
FIG. 3 is a simplified elevational view, in cross section, of an environment with a wellbore wherein a distance to non-parallel bed boundaries from a position in the wellbore is shown in accord with one possible embodiment of the present invention.

Referring to FIG. 3, at an intermediate tool position in the middle bed, or point 3, the distance to the upper bed boundary and the distance to the lower bed boundary may be represented by drawing lines perpendicular to the respective bed boundaries, as indicated.

Figure 4:
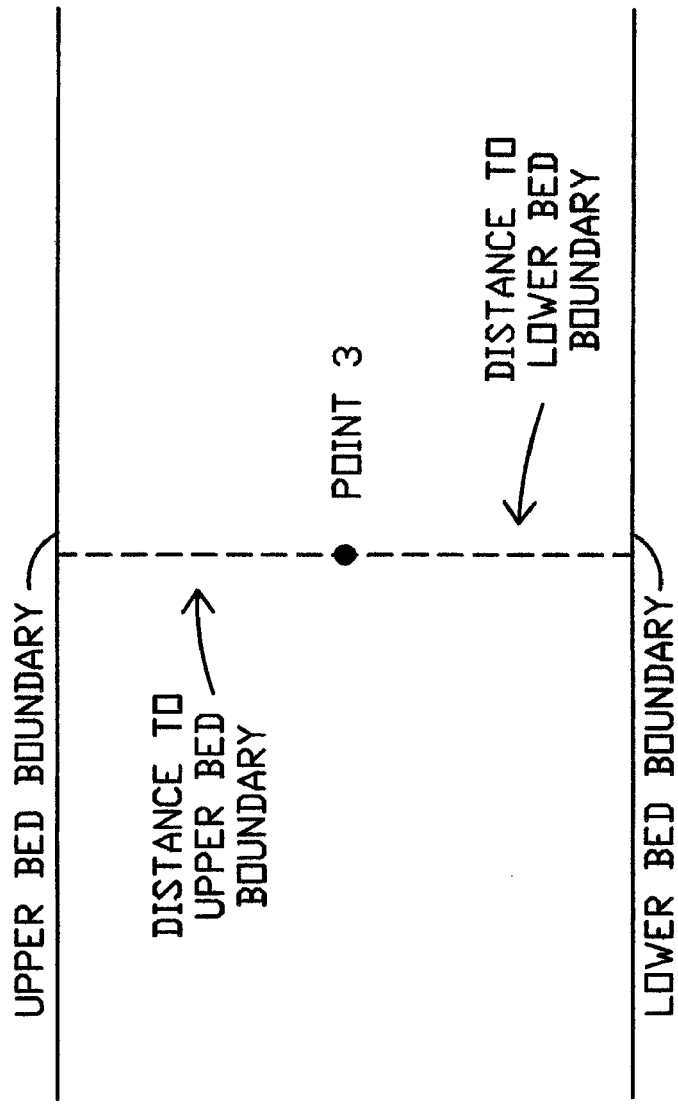
FIG. 4 is a simplified elevational view, in cross section, wherein the environment of FIG. 3 is reconfigured and the combined perpendicular distance between bed boundaries from the position in the wellbore is shown in accord with one possible embodiment of the present invention.

So when the tool is at point 3, the apparent thickness of the middle bed, as it would appear to the tool with parallel upper and lower bed boundaries, is shown as combination of these distances in FIG. 4. Accordingly, FIG. 4 shows the two bed boundaries as parallel and the two distances of FIG. 3 are added together, as illustrated. This apparent thickness changes as the tool moves.

A computed log which is related to $\pi_{z2}^{TMU}$ of a vertical magnetic dipole (VMD) in parallel beds (49) splits into 4 terms using P' (52) (see SPE 84606 referenced hereinbefore). For convenience, equations may often be referenced herein by showing the equation number in parenthesis.

$$\pi_{z2}^{TMU} = \pi_{z2}^{TMU1} + \pi_{z2}^{TMU2} + \pi_{z2}^{TMU3} + \pi_{z2}^{TMU4} \quad (54)(1)$$

where $$\pi_{z2}^{TMU1} = \frac{M_v}{4\pi} \int_0^\infty \frac{1}{\Delta_h \xi_2} (k_{32} + k_{23})(k_{12} + k_{21}) e^{\xi_2(z_0 - z)} \lambda J_0(\lambda \rho) d\lambda \quad (55)(2)$$

$$\pi_{z2}^{TMU2} = \frac{M_v}{4\pi} \int_0^\infty \frac{1}{\Delta_h \xi_2} (k_{32} + k_{23})(k_{12} - k_{21}) e^{\xi_2(+(z_0 - h) + (z - h))} \lambda J_0(\lambda \rho) d\lambda \quad (56)(3)$$

$$\pi_{z2}^{TMU3} = \frac{M_v}{4\pi} \int_0^\infty \frac{1}{\Delta_h \xi_2} (k_{32} - k_{23})(k_{12} + k_{21}) e^{\xi_2(-(z_0 - (-h)) - (z - (-h)))} \lambda J_0(\lambda \rho) d\lambda \quad (57)(4)$$

and $$\pi_{z2}^{TMU4} = \frac{M_v}{4\pi} \int_0^\infty \frac{1}{\Delta_h \xi_2} (k_{32} - k_{23})(k_{12} - k_{21}) e^{-\xi_2(z_0 - z)} e^{-4\xi_2 h} \lambda J_0(\lambda \rho) d\lambda \quad (58)(5)$$

Terms one (T1) $\pi_{x2}^{TMU1}$ and four (T4) $\pi_{x2}^{TMU4}$ are constants because the distance $(z_0 - z)$ between the source at $z_0$ and receiver at $z$ is constant since the transmitter-receiver distance $(z_0 - z)$ is fixed at the manufacture of the tool. Terms two (T2) $\pi_{x2}^{TMU2}$ and three (T3) $\pi_{x2}^{TMU3}$ decay in the downward and upward directions respectfully. (See FIG. 5)

Figure 13:
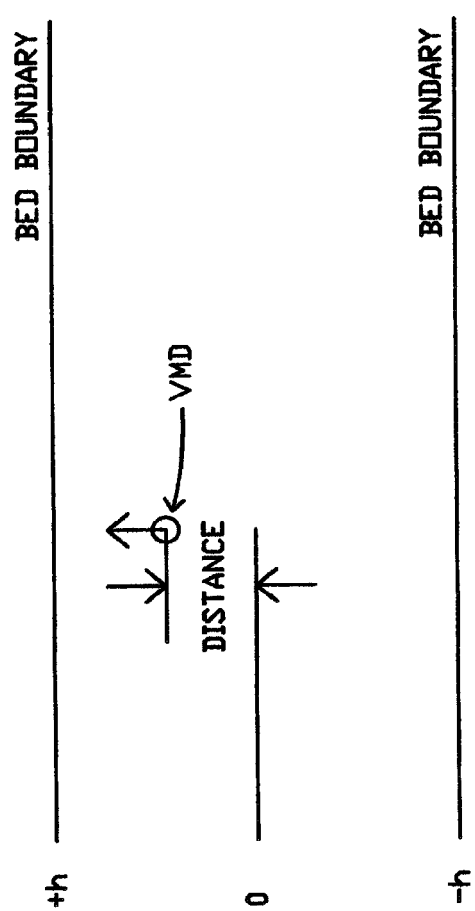
FIG. 13 is a simplified elevational view of a vertical magnetic dipole (VMD) at a distance $z_0$ in a bed with bound boundaries at $-h$ and $+h$ in accord with one possible embodiment of the present invention.
Figure 14:
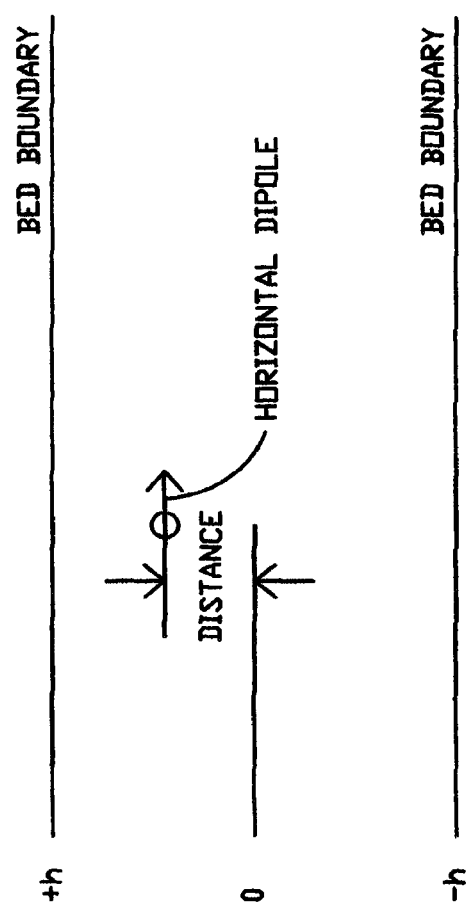
FIG. 14 is a simplified elevational view of a horizontal magnetic dipole (HMD) at a distance $z_0$ in a bed with bound boundaries at $-h$ and $+h$ in accord with one possible embodiment of the present invention.

When the beds are parallel, it is the perpendicular distance of the transmitter at $z_0$ and receiver at $z$ relative to the bed boundary at $+h$ that determines the T2 response [note $+(z_0 - h)$ and $+(z - h)$ in (3)] and the bed boundary at h that determines the T3 response [note $-(z_0 - (-h))$ and $-(z - (-h))$ in (4)]. T4 because of the factor $e^{-4\xi_2 h}$ is usually small and not shown. As one example, FIG. 13 and FIG. 14 shows a tool at a distance $z_0$ from the center of a bed, with bed boundaries at $+h$ and $-h$.

Associated with each bed and each bed boundary are four (4) terms. FIG. 5 shows T1, T2, and T3 for a bed. FIG. 6 shows T1, T2, and T3 for a bed boundary. The fourth term may also be utilized but is typically less significant and is not shown. However, it may be utilized if desired.

Figure 7:
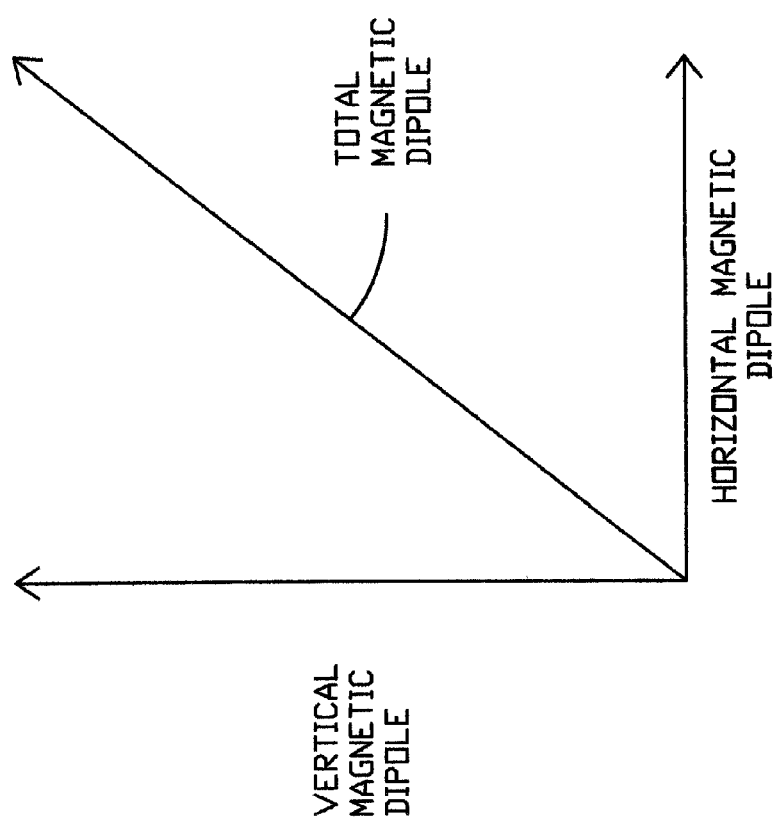
FIG. 7 is a plot of a composite magnetic dipole with a vertical magnetic dipole (VMD) component and a horizontal magnetic dipole (HMD) component in accord with one possible embodiment of the present invention.

For use with an electromagnetic logging tool, the transmitter or source is a magnetic dipole. As indicated if FIG. 7, this magnetic dipole can be resolved into a vertical magnetic dipole (VMD) and a horizontal magnetic dipole (HMD). The VMD and HMD each split into 4 terms. The resolution is determined by the apparent dip angle of each bed boundary relative to the transmitter in the tool.

Figure 8:
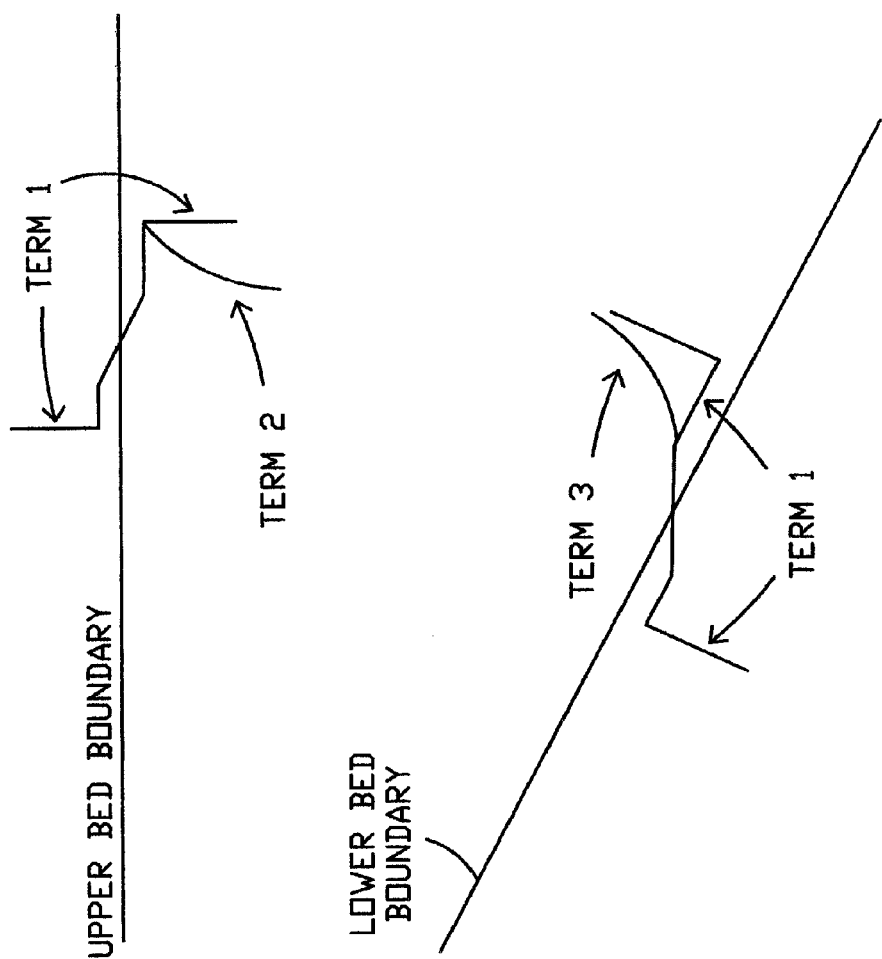
FIG. 8 is a plot of a term 1 and term 2 for an upper bed boundary and a term 1 and term 3 for a lower bed boundary with respect to depth in accord with one possible embodiment of the present invention.

As indicated in FIG. 8, one possible way to compute a log in nonparallel beds is to compute the fields due to T3 of a VMD and of a HMD using a TM-TE split method due to the lower bed boundary. The method involves changing the thickness of the bed as the tool moves at the angle of the transmitter relative to the lower bed boundary. The method may then comprise computing the fields due to T2 of a VMD and a HMD for the upper bed boundary as the tool moves. Other steps may comprise changing the thickness of the bed as the tool moves at the angle of the transmitter relative to the upper bed boundary Additional steps may comprise computing T1 and T4 due to the lower bed boundary as the tool moves while changing the thickness of the bed at the angle of the transmitter relative to the lower bed boundary. T1 and T4 may also be computed due to the upper bed boundary as the tool moves changing the thickness of the bed at the angle of the transmitter relative to the upper bed boundary.

If the bed is relatively thick, T4 is small and T1 from the upper bed boundary and lower bed boundary is typically the same at the middle of the bed. If the bed is relatively thin, T1 and/or T4 may not be the same at the middle of the bed. When this occurs it is necessary to adjust T1 and/or T4 so they are the same at the middle of the bed. One possible way to adjust T1 and T4 is to take a combination of T1 and T4 as the tool moves. This may be accomplished in many different ways with averaging techniques and the like. As one simple example, 100% of T1 and T4 may be taken when the tool is at the bottom of the layer. When the tool is at the middle, 50% may be taken from the bottom and 50% from the top. When the tool is at the top of the bed, 100% may be taken from the top of the layer.

Figure 9:
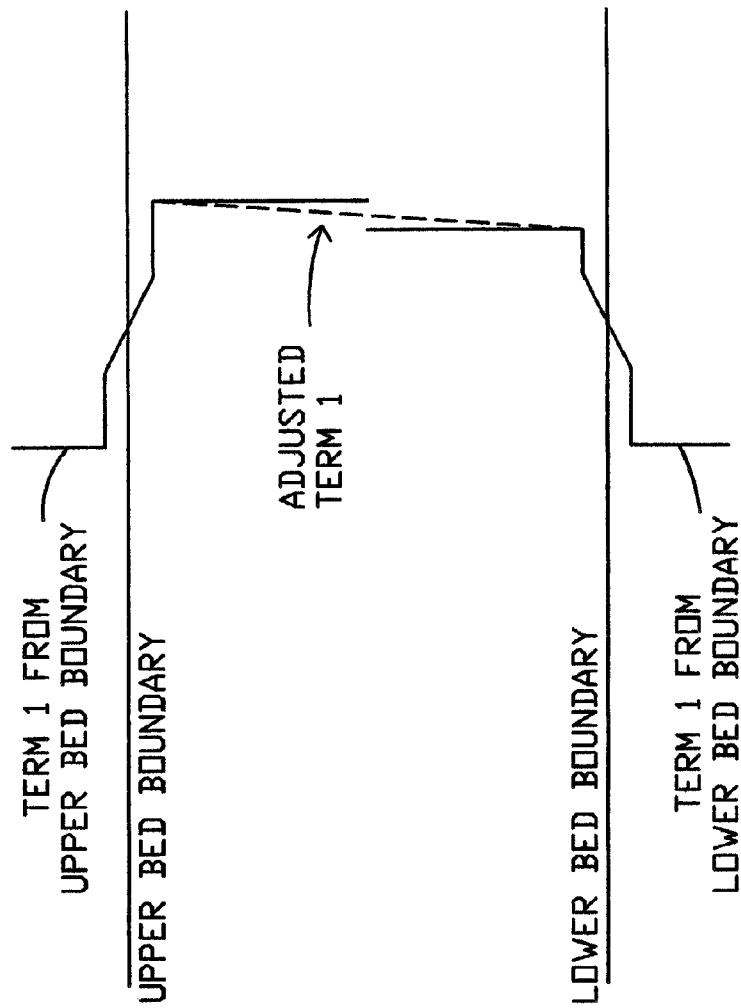
FIG. 9 is a plot with respect to depth of an adjusted or combined term 1 due to a first term 1 for an upper bed boundary and a second term 1 for a lower bed boundary in accord with one possible embodiment of the present invention.

In FIG. 9, T1 is adjusted or combined so that it provides continuous readings between the upper bed boundary and the lower bed boundary. After the adjustment is made, the log is computed by summing the apparent dip corrected T3 from the bottom boundary, T2 from the top boundary and the adjusted or combined T1 and/or T4.

In one embodiment of the method for inverting a log, because the bed boundary angular effect is localized at a single bed boundary, the bed boundary angle of a single bed boundary can be varied until the computed log best matches the measured log. A bed boundary orientation can be changed by changing T1, T2, T3 and T4 for that bed boundary and recombining the terms. A bed boundary can be moved by shifting T1, T2, T3 and T4 associated with that bed boundary and recombining the terms.

It will be appreciated that the above method may also be utilized to detect the orientation and position of a tool for use in geosteering whereby it is often desirable to remain within a distance and at an orientation with respect to an upper bed boundary. As used herein, bed boundary may refer not only to two layers of rock but also to a fluid/fluid interface such as a water/oil interface, gas/liquid interface, or the like. Other uses may comprise detecting and orientating fractures.

Figure 10:
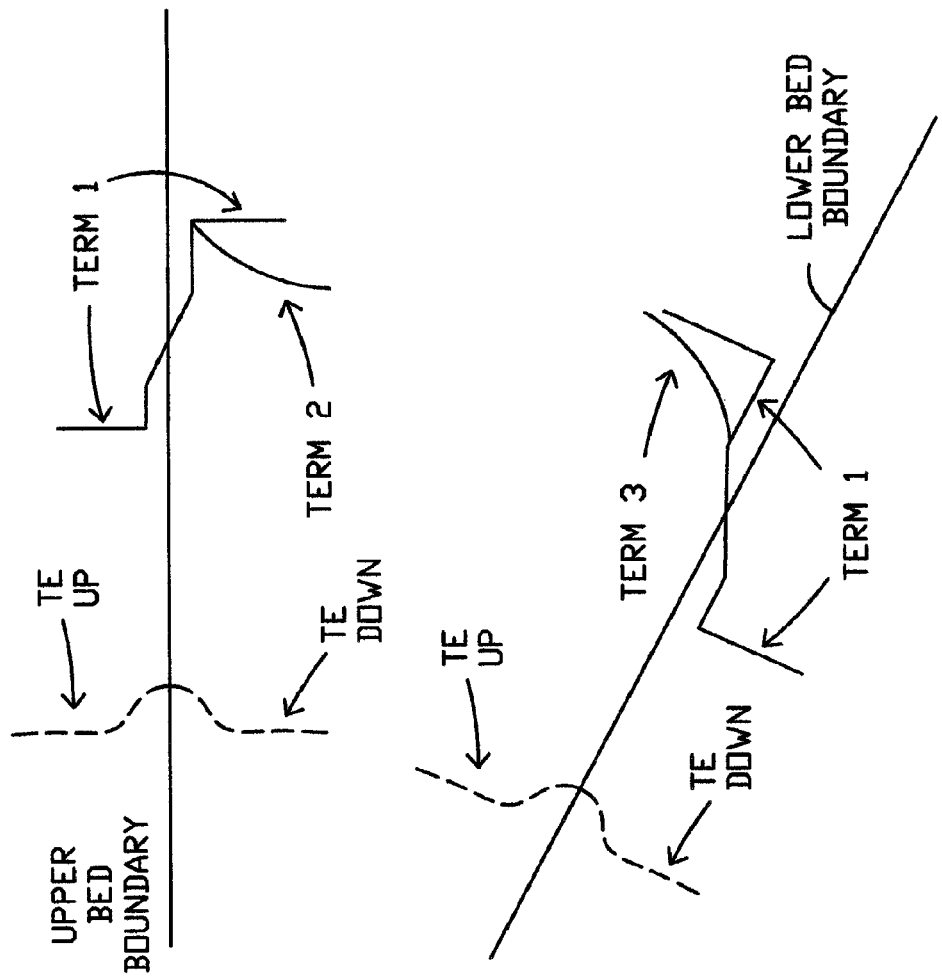
FIG. 10 is a plot with respect to depth of a term 1, term 2, and transverse electric part due to an upper bed boundary and a term 1, term 2, and transverse electric part due to a lower bed in accord with one possible embodiment of the present invention.

As suggested by FIG. 10, a more accurate although slower method to compute a log is to compute the transverse electric, (TE) part for a HMD and for a VMD (see equations (99) through (102)) and T3 of the transverse magnetic (TM) part for a HMD and for a VMD (see equations (4) and (57)) due to the lower bed boundary as the tool moves, changing the thickness of the bed as the tool moves at the angle of the transmitter relative to the lower bed boundary. Additional steps may comprise computing the TE part for a HMD and for a VMD (see equations (76) through (79)) and T2 of the TM part for a HMD and for a VMD (see equations (3) and (56)) due to the upper bed boundary as the tool moves, changing the thickness of the bed as the tool moves at the angle of the transmitter relative to the upper bed boundary.

The method may also utilize T1 for a HMI) and a VMD (see equations (2) and (55)) and T4 for a HMD and a VMD of the TM response (see equations (5) and (58)). Accordingly, the method may comprise computing T1 and/or T4 due to the lower bed boundary as the tool moves, changing the thickness of the bed at the angle of the transmitter relative to the lower bed boundary. Additionally, T1 and T4 may be computed due to the upper bed boundary as the tool moves, changing the thickness of the bed at the angle of the transmitter relative to the upper bed boundary.

Similar to the discussion above, if the bed is relatively thick, T4 is small and T1 from the upper bed boundary and lower bed boundary is typically same at the middle of the bed. If the bed is relatively thin, T1 and T4 might not be the same at the middle of the bed. When this occurs it is necessary to adjust T1 and T4 so they are the same at the middle of the bed. A way to adjust T1 and T4 is to take a combination of T1 and T4 as the tool moves. A way to do this is to take 100% of T1 and T4 from the bottom T1 and T4 when the tool is at the bottom. When the tool is at the middle take 50% from the bottom and 50% from the top T1 and T4. When at the top of the bed take 100% from the top T1 and T4 as before. (See FIG. 9) After the adjustment is made, the log may be computed by summing the apparent dip corrected TE parts form the top and bottom, T3 from the bottom TM response, T2 from the top TM response and the adjusted T1 and T4 of the TM response.

Since this bed boundary angular effect is localized to a single bed boundary, the bed boundary angle of a single bed boundary can be varied until the computed log best matches the measured log. A bed boundary orientation can be changed by recomputing T1, T2, T3 and T4 of the TM part and the TE part associated with that bed boundary and recombining the parts as above. A bed boundary can be moved by shifting or recomputing T1, T2, T3, T4 of the TM part and the TE part associated with that bed boundary and recombining the parts as above.

Like the previously described method, this method may also be utilized to detect the orientation and position of a tool for use in geosteering whereby it is often desirable to remain within a distance and at an orientation with respect to an upper bed boundary. Other uses may comprise detecting and orientating fractures.

Figure 11:
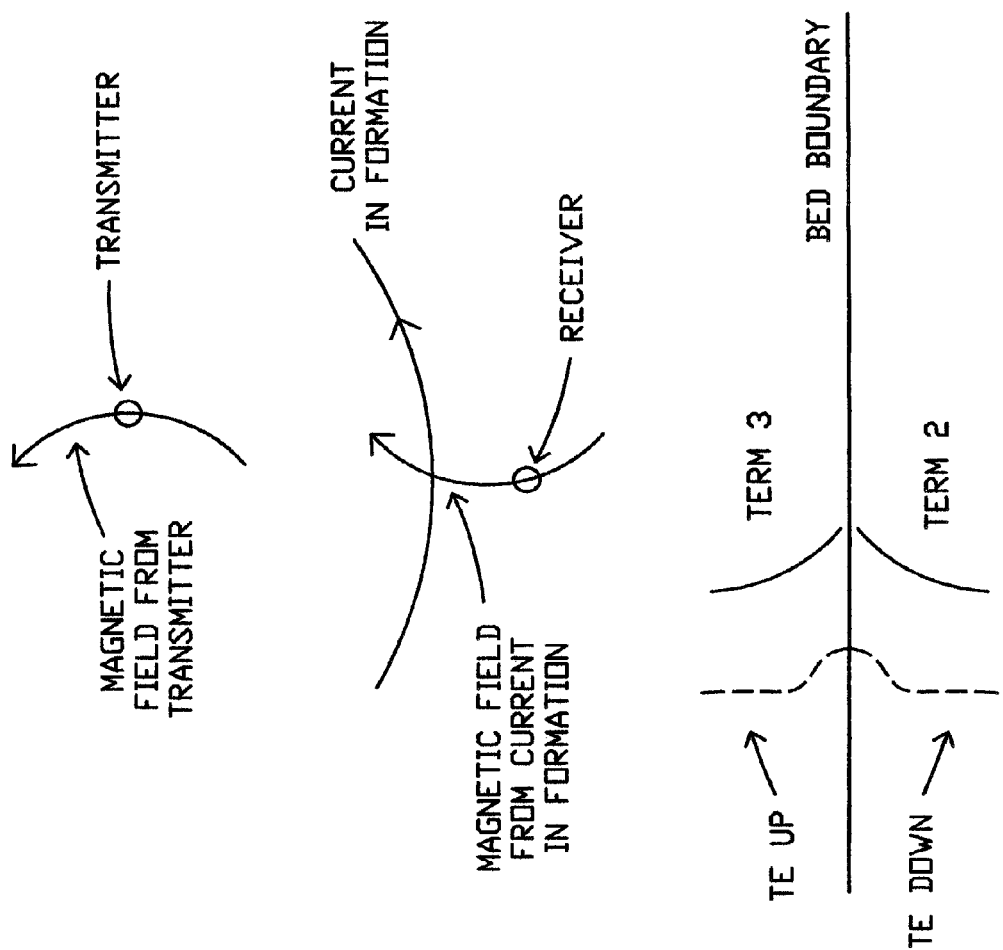
FIG. 11 is a schematic which shows an electromagnetic field produced by a transmitter and detected by a receiver as a voltage, which has a proportional relationship to conductivity of a formation in a thick bed. However, the proportional relationship of voltage to conductivity changes near a bed boundary, which change may be explained as a result of a transverse electric part, term 2, and term 3 induced near the bed boundary due to the electromagnetic field produced by the transmitter and detected by the receiver.

As suggested by FIG. 11, the induction instrument performs a process on the geologic formation. The time varying current from the transmitter induces electromagnetic fields in the geologic formation. The electric field induces current via J=σE in the formation. This current in turn induces a voltage in the receiver. In some tools, the induced voltage is directly related to the conductivity, σ, of the geologic formation. At the middle of a thick bed, there is just T1 and this does not vary with angle. However, the relationship between induced voltage and conductivity may change near bed boundaries. When there are bed boundaries, these bed boundaries induce T2, T3 and T4 of the TM response and the TE parts which occur only near bed boundaries. As shown by the equations and discussion hereinafter, it will be seen that the TE parts are directly related to the difference in the physical properties $k^2=\omega^2\mu\varepsilon$ (20) between the upper and lower beds. The angle of the tool/hole relative to the formation is determined by the bed boundaries.

One possible way to invert logs to obtain the actual material properties may utilize thin bed material derivatives. A thin bed material derivative is the change or difference in a log when the actual material property $$k^2 = \omega^2\mu\varepsilon = \omega^2\mu\left(\varepsilon' + i\frac{\sigma}{\omega}\right)$$

from equations (20) and (16), mainly the electrical conductivity σ of a single thin bed changes. If the thin bed material derivatives for all of the beds are known, prior art methods can be utilized to obtain the actual material properties, assuming the bed boundaries are parallel. However, even with this assumption, prior art methods require that each derivative is a separate log which must be computed separately, which is very time consuming. The present method is much faster because the thin bed material derivatives are approximated, which reduces the time to invert a log to obtain the actual material properties based on utilizing $k^2$ (see equation 20), as discussed hereinafter.

Accordingly, referring to equations (6) through (9) and/or equations (80) through (83), $\pi_z^{TEU}$ (for the case of the source in the middle or second layer $\pi_z^{TEU}$ for a VMD for the upper (U) bed boundary at $+h$ becomes:

$$\pi_{z1}^{TEU} = \frac{M_v}{4\pi}(k_1^2 - k_2^2)\int_0^\infty \frac{2P'e^{-2\xi_2 h}}{\Delta_v \Delta_h} \xi_2 H^{+h} e^{-\xi_1(z-h)} \times \lambda J_0(\lambda\rho)d\lambda \quad (80)(6)$$

$$---h$$

$$\pi_{z2}^{TEU} = \frac{-M_v}{4\pi}(k_1^2 - k_2^2)\int_0^\infty \frac{2P'e^{-2\xi_2 h}}{\Delta_v \Delta_h} \quad (81)(7)$$
$$\xi_1[(\xi_2 + \xi_3)e^{-\xi_2(z-h)} + (\xi_1 - \xi_3)e^{-\xi_2(z-h+4h)}] \times \lambda J_0(\lambda\rho)d\lambda$$

$$= \frac{-M_v}{4\pi}(k_1^2 - k_2^2)\int_0^\infty \frac{2P'e^{-2\xi_2 h}}{\Delta_v \Delta_h} e^{-2\xi_2 h} \quad (82)(8)$$
$$\xi_1[(\xi_2 + \xi_3)e^{\xi_2(z+h)} + (\xi_2 - \xi_3)e^{-\xi_2(z+h)}] \times \lambda J_0(\lambda\rho)d\lambda$$

$$---h$$

$$\pi_{z3}^{TEU} = \quad (83)(9)$$
$$\frac{-M_v}{4\pi}(k_1^2 - k_2^2)\int_0^\infty \frac{2P'e^{-2\xi_2 h}}{\Delta_v \Delta_h} e^{-2\xi_2 h}\xi_1 2\xi_2 e^{\xi_3(z+h)} \times \lambda J_0(\lambda\rho)d\lambda$$

The symbol - - - - is used in this case to show the bed boundaries.

$\pi_2^{TEU}$ is proportional to the difference in material properties $k^2 = \omega^2 \mu \varepsilon$ (20) $(k_1^2 - k_2^2)$ between the upper (equation (1)) and middle (equation (2)) beds. $\pi_z^{TEU}$ for a HMD is similar.

$\pi_z^{TEL}$ (equations (10) through (13)) and/or (equations (103) through (106)) for the case of the source in the middle or second layer $\pi_z^{TEL}$ for a VMD for the lower (L) bed boundary at $-h$ becomes:

$$\pi_{z1}^{TEL} = \quad (103)(10)$$
$$\frac{M_v}{4\pi}(k_2^2 - k_3^2)\int_0^\infty \frac{2Q'e^{-2\xi_2 h}}{\Delta_h \Delta_v} e^{-2\xi_2 h}\xi_3 2\xi_2 e^{-\xi_1(z-h)}\lambda J_0(\lambda\rho)d\lambda$$

$$---h$$

$$\pi_{z2}^{TEL} = \frac{M_v}{4\pi}(k_2^2 - k_3^2)\int_0^\infty \frac{2Q'e^{-2\xi_2 h}}{\Delta_h \Delta_v} e^{-2\xi_2 h} \quad (104)(11)$$
$$\xi_3[(\xi_2 + \xi_1)e^{-\xi_2(z-h)} + (\xi_2 - \xi_1)e^{\xi_2(z-h)}] \times \lambda J_0(\lambda\rho)d\lambda$$

$$= \frac{M_v}{4\pi}(k_2^2 - k_3^2)\int_0^\infty \frac{2Q'e^{-2\xi_2 h}}{\Delta_h \Delta_v} \quad (105)(12)$$
$$\xi_3[(\xi_2 + \xi_1)e^{-\xi_2(z+h)} + (\xi_2 - \xi_1)e^{\xi_2(z+h-4h)}] \times \lambda J_0(\lambda\rho)d\lambda$$

$$---h$$

$$\pi_{z3}^{TEL} = \frac{-M_v}{4\pi}(k_2^2 - k_3^2)\int_0^\infty \frac{2Q'e^{-2\xi_2 h}}{\Delta_h \Delta_v} \xi_2 H^{-h} e^{\xi_3(z+h)}\lambda J_0(\lambda\rho)d\lambda \quad (106)(13)$$

$\pi_z^{TEL}$ proportional to the difference in material properties $k^2 = \omega^2 \mu \varepsilon$ (20) $(k_2^2 - k_3^2)$ between the middle (equation (2)) and lower (equation (3)) beds. $\pi_z^{TEL}$ for a horizontal magnetic dipole (HMD) is similar.

For $\pi_z^{TEU}$ $(\pi_{z1}^{TEU}, \pi_{z2}^{TEU}, \pi_{z3}^{TEU})$, $(k_1^2 - k_2^2)$ is outside the integral and for $\pi_z^{TEL}$ $(\pi_{z1}^{TEL}, \pi_{z2}^{TEL}, \pi_{z3}^{TEL})$, $(k_2^2 - k_3^2)$ is outside the integral. Since the difference in $k^2$ is a constant, it is outside the integral in both cases If $k_2^2$ of a bed changes, the difference in $k^2$ of the bed boundary above $(k_1^2 - k_2^2)$ and below $(k_2^2 - k_3^2)$ changes. This will change the TE parts for the Upper (U) part of $\pi_z^{TE}$, $\pi_z^{TEU}$ and the Lower (L) part of $\pi_z^{TE}, \pi_z^{TEL}$.

This difference in $k^2$ is useful in inverting logs because it allows the thin bed material derivatives to be approximated. This difference or change in the TE part approximates a thin bed material derivative, so one method involves computing the TE integrals without the difference in $k^2$. The new differences in $k^2$ are computed, and the new TE part is computed. The old TE part may be subtracted from the new TE parts to compute the approximate material derivatives. This provides for a very quick computation of material derivatives.

Figure 12:
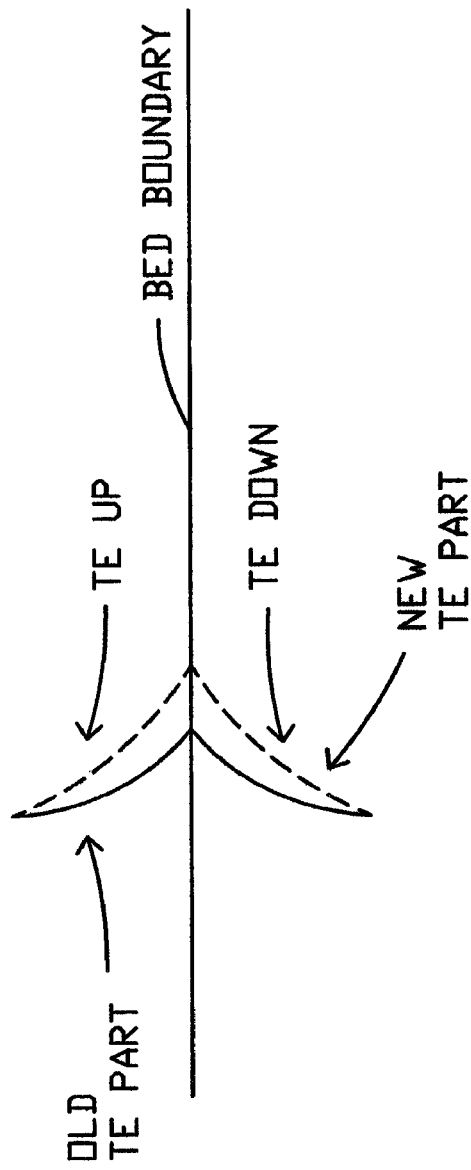
FIG. 12 is a plot with respect to depth wherein a derivative of a transverse electric part at a bed boundary is utilized to determine a new transverse electric part, which may then be utilized to invert a log in accord with one possible embodiment of the present invention.

FIG. 12 shows a visual example of the new TE part and the old TE part for the upper bed boundary at $+h$. The method may comprise doing the same thing for the lower bed boundary at $-h$.

Accordingly, the method may use the material derivatives to invert the log, to obtain the actual material properties $$k^2 = \omega^2 \mu \varepsilon = \omega^2 \mu \left(\varepsilon' + i\frac{\sigma}{\omega}\right)$$

(equations (20) (16)).

The convergence criterion used to stop the iteration process varies with the situation. If a rough estimate is required, a 10 (ten) percent difference between the measure and computed result might be sufficient. If a better result is required a 1 (one) percent difference might be required.

Accordingly, one embodiment of the method allows quickly changing a log by changing a constant involving $k^2$.

Electromagnetic Fields Due to a Vertical Magnetic Dipole

For sinusoidally time-varying fields with time variation taken as $e^{-iwt}$, Maxwell's equations take the form $$\nabla \times H = -i\omega\varepsilon E \quad (14)$$

and $$\nabla \times E = i\omega\mu H + i\omega\mu M_s. \quad (15)$$

It is assumed that the only source in the medium is a magnetic dipole with dipole moment, $M_s$. The complex permittivity $\varepsilon$ in equation (14) is:

$$\varepsilon = \varepsilon' + i\frac{\sigma}{\omega} \quad (16)$$

where $\varepsilon'$ is the dielectric permittivity and $\sigma$ is the electrical conductivity of the medium.

It can be shown that if a vector potential function, which may be called the Hertz vector potential $\pi$, is introduced, then $$E = i\omega\mu\nabla \times \pi, \quad (17)$$

$$H = \nabla(\nabla \cdot \pi) + k^2\pi, \quad (18)$$

and $$\nabla^2 \pi + k^2 \pi = -M_s, \quad (19)$$

where $$k^2 = \omega^2 \mu \varepsilon. \quad (20)$$

Now consider the vertical magnetic dipole (VMD) shown in FIG. 13. Due to the rotational symmetry about the z-axis of the geometry, the cylindrical coordinate system is used. The magnetic dipole is located at x=0, y=0, or ρ=0 and z=$z_0$, and pointing in the z direction, while the bed boundaries are at z=±h.

For a VMD, equation (19) reduces to a scalar equation.

$$\nabla^2 \pi_z + k^2 \pi_z = -M_v \delta(r - z_0 \hat{z}), \quad (21)$$

where $M_v$ is the vertical component of the total dipole moment $M_s$.

The particular solution of equation (21) is $\pi_{z0}$ $$\pi_{z0} = \frac{M_v}{4\pi} \int_0^\infty \frac{1}{\xi} e^{-\xi|z-z_0|} \lambda J_0(\lambda \rho) d\lambda, \quad (22)$$

where $J_0$ is the zero order Bessel function of the first kind and $$\xi = (\lambda^2 - k^2)^{1/2}. \quad (23)$$

The branch of ξ is so chosen that ξ=λ as λ approaches infinity and ξ=−ik for λ=0.

The components of the electromagnetic field are:

$$E_\phi = -i\omega\mu \frac{\delta \pi_z}{\delta \rho} \quad (24)$$

from (17) and $$H_\rho = \frac{d}{d\rho}\left[\frac{d\pi_z}{dz}\right] = \frac{d}{dz}\left[\frac{d\pi_z}{d\rho}\right] \quad (25)$$

from (18).

To satisfy the boundary condition on tangential E, and $E_\phi$, and H, $H_\rho$, at z=±h, the following boundary conditions must be satisfied. From equation $$\pi_{zj} = \pi_{z(j+1)}, \quad (26)$$

and from equation (25):

$$\frac{d\pi_{zj}}{dz} = \frac{d\pi_{z(j+1)}}{dz}. \quad (27)$$

The above boundary conditions are enforced at z=h for j=1 and at z=−h for j=2. $\pi_z$ of a VMD, can be expressed in terms of $\pi_z^{TM}$ which is mathematically transverse magnetic (TM) and $\pi_z^{TE}$ which is physically transverse electric (TE):

$$\pi_z = \pi_z^{TM} + \pi_z^{TE}. \quad (28)$$

$\pi_z^{TM}$ is physically TE because the E field using $E = i\omega\mu\nabla \times (\pi_z^{TM}\hat{z})$ (17) is in the x and y directions, which are transverse to the z axis. Therefore, $(\pi_z^{TM} + \pi_z^{TE})$ is physically TE.

Restating the boundary conditions for $\pi_z$ assuming $\mu_1 = \mu_2 = \mu_3 = \mu$:

$$\pi_{zj} = \pi_{z(j+1)} \quad (26)(29)$$

$$\frac{d\pi_{zj}}{dz} = \frac{d\pi_{z(j+1)}}{dz}. \quad (27)(30)$$

Let the equivalent boundary conditions on $\pi_z^{TM}$ and $\pi_z^{TE}$ be:

$$\frac{d\pi_{zj}^{TE}}{dz} = \frac{d\pi_{z(j+1)}^{TE}}{dz} \quad (31)$$

$$\frac{d\pi_{zj}^{TM}}{dz} = \frac{d\pi_{z(j+1)}^{TM}}{dz} \quad (32)$$

$$\pi_{zj}^{TM} + \pi_{zj}^{TE} = \pi_{z(j+1)}^{TM} + \pi_{z(j+1)}^{TE} \quad (33)$$

$$x_j \pi_{zj}^{TM} = x_{(j+1)} \pi_{z(j+1)}^{TM}. \quad (34)$$

Note that equation (33) is equivalent to (26) or (29) using (28). Equation (31) plus (32) is equivalent to (27) or (30) again using (28). $x_j$ in (34) can be anything, such as $k_j^2$. Setting $x_j$ to be $k_j^2$ in (34). Thus the equivalent boundary conditions (31) through (34) become:

$$\frac{d\pi_{zj}^{TE}}{dz} = \frac{d\pi_{z(j+1)}^{TE}}{dz} \quad (31)(35)$$

$$\frac{d\pi_{zj}^{TM}}{dz} = \frac{d\pi_{z(j+1)}^{TM}}{dz} \quad (32)(36)$$

$$\pi_{zj}^{TM} + \pi_{zj}^{TE} = \pi_{z(j+1)}^{TM} + \pi_{z(j+1)}^{TE} \quad (33)(37)$$

$$k_j^2 \pi_{zj}^M = k_{(j+1)}^2 \pi_{z(j+1)}^{TM}. \quad (38)$$

Restating the boundary conditions, equation (37) is equivalent to (26) or (29) using (28). (35) plus (36) is equivalent to (27) and (30) again using (28). The above boundary conditions (35) through (38) are enforced at z=h for j=1 and at z=−h for j=2.

The Hertz potential $\pi_z^{TM}$ satisfies the inhomogeneous partial differential equation (19) with $M_s = M_v \delta(r-z_0\hat{z})\hat{z}$. Accordingly $\pi_z^{TM}$ can be expressed as:

$$\pi_{z1}^{TM} = \frac{M_v}{4\pi} \int_0^\infty \left[\frac{\beta_1}{\xi_1} e^{-\xi_1|z-z_0|} + P_1 e^{-\xi_1(z-h)}\right] \lambda J_0(\lambda\rho) d\lambda \quad (39)$$
--- h $$\pi_{z2}^{TM} = \frac{M_v}{4\pi} \int_0^\infty \left[\frac{\beta_2}{\xi_2} e^{-\xi_2|z-z_0|} + Q_2 e^{\xi_2(z-h)} + P_2 e^{-\xi_2(z+h)}\right] \lambda J_0(\lambda\rho) d\lambda \quad (40)$$
--- −h $$\pi_{z3}^{TM} = \frac{M_v}{4\pi} \int_0^\infty \left[\frac{\beta_3}{\xi_3} e^{-\xi_3|z-z_0|} + Q_3 e^{\xi_3(z+h)}\right] \lambda J_0(\lambda\rho) d\lambda \quad (41)$$

The symbol - - - - is used in this case to show the bed boundaries at ±h, and later to show the position of the source at $z_0$ (see equations between (49) and (50)). Because the source could be in any of the three layers, the β s are flags that indicate in which medium the source is located. For example, if the source is in the middle or second medium, $\beta_2 = 1$ and $\beta_1 = \beta_3 = 0$. By applying the boundary conditions (see equations (36) and (38)), we obtain four equations to solve for the four unknown functions $P_1$, $Q_2$, $P_2$ and $Q_3$.

For the case of the source in the middle or second layer, $\beta_2=1$:

$$P_1 = \frac{e^{-2\xi_2 h}}{\Delta_h \xi_2}[(k_{32}+k_{23})e^{\xi_2(z_0+h)}+(k_{32}-k_{23})e^{-\xi_2(z_0+h)}]2k_{22} \quad (42)$$

$$Q_2 = \frac{e^{-2\xi_2 h}}{\Delta_h \xi_2}(k_{12}-k_{21})[(k_{32}+k_{23})e^{\xi_2(z_0+h)}+(k_{32}-k_{23})e^{-\xi_2(z_0+h)}] \quad (43)$$

$$P_2 = \frac{e^{-2\xi_2 h}}{\Delta_h \xi_2}(k_{32}-k_{23})[(k_{12}+k_{21})e^{\xi_2(z_0-h)}+(k_{12}-k_{21})e^{-\xi_2(z_0-h)}] \quad (44)$$

and $$Q_3 = \frac{e^{-2\xi_2 h}}{\Delta_h \xi_2}[(k_{12}+k_{21})e^{-\xi_2(z_0+h)}+(k_{12}-k_{21})e^{\xi_2(z_0-h)}]2k_{22} \quad (45)$$

where $$\Delta_h = (k_{12}+k_{21})(k_{32}+k_{23})-(k_{12}-k_{21})(k_{32}-k_{23})e^{-4\xi_2 h} \quad (46)$$

and $$k_{mn} - k_m^2 \xi_n. \quad (47)$$

For the case of the source in the middle or second layer $\beta_2=1$, the middle layer splits into an upper (U) part where $z>z_0, \pi_{z2}^{TMU}$, and a lower (L) part where $z<z_0, \pi_{z2}^{TML}$:

$$\pi_{z1}^{TM} = \frac{M_v}{4\pi}\int_0^\infty \frac{e^{-2\xi_2 h}}{\Delta_h \xi_2} P' 2k_{22} e^{-\xi_1(z-h)}\lambda J_0(\lambda\rho)d\lambda \quad (48)$$

---h $$\pi_{z2}^{TMU} = \frac{M_v}{4\pi}\int_0^\infty \frac{e^{-2\xi_2 h}}{\Delta_h \xi_2} P'[(k_{12}+k_{21})e^{-\xi_2(z-h)}+(k_{12}-k_{21})e^{\xi_2(z-h)}]\lambda J_0(\lambda\rho)d\lambda \quad (49)$$

---

$z_0$ $$\pi_{z2}^{TML} = \frac{M_v}{4\pi}\int_0^\infty \frac{e^{-2\xi_2 h}}{\Delta_h \xi_2} Q'[(k_{32}+k_{23})e^{\xi_2(z+h)}+(k_{32}-k_{23})e^{-\xi_2(z+h)}]\lambda J_0(\lambda\rho)d\lambda \quad (50)$$

--- -h $$\pi_{z3}^{TM} = \frac{M_v}{4\pi}\int_0^\infty \frac{e^{-2\xi_2 h}}{\Delta_h \xi_2} Q' 2k_{22} e^{\xi_3(z+h)}\lambda J_0(\lambda\rho)d\lambda \quad (51)$$

where $$P' = (k_{32}+k_{23})e^{\xi_2(z_0+h)}+(k_{32}-k_{23})e^{-\xi_2(z_0+h)} \quad (52)$$

and $$Q' = (k_{12}+k_{21})e^{-\xi_2(z_0-h)}+(k_{12}-k_{21})e^{\xi_2(z_0-h)} \quad (53)$$

Using P' (52), $\pi_{z2}^{TMU}$ (49) splits into four (4) terms. For the case of the source in the middle or second layer $\beta_2=1$:

$$\pi_{z2}^{TMU}=\pi_{z2}^{TMU1}+\pi_{z2}^{TMU2}+\pi_{z2}^{TMU3}+\pi_{z2}^{TMU4} \quad (1)(54)$$

where $$\pi_{z2}^{TMU1} = \frac{M_v}{4\pi}\int_0^\infty \frac{1}{\Delta_h \xi_2}(k_{32}+k_{23})(k_{12}+k_{21})e^{\xi_2(z_0-z)}\lambda J_0(\lambda\rho)d\lambda \quad (2)(55)$$

$$\pi_{z2}^{TMU2} = \quad (3)(56)$$

$$\frac{M_v}{4\pi}\int_0^\infty \frac{1}{\Delta_h \xi_2}(k_{32}+k_{23})(k_{12}+k_{21})e^{\xi_2(+(z_0-h)+(z-h))}\lambda J_0(\lambda\rho)d\lambda$$

$$\pi_{z2}^{TMU3} = \frac{M_v}{4\pi}\int_0^\infty \frac{1}{\Delta_h \xi_2}(k_{32}-k_{23}) \quad (4)(57)$$

$$(k_{12}+k_{21})e^{\xi_2(-(z_0-(-h))-(z-(-h)))}\lambda J_0(\lambda\rho)d\lambda$$

and $$\pi_{z2}^{TMU4} = \quad (5)(58)$$

$$\frac{M_v}{4\pi}\int_0^\infty \frac{1}{\Delta_h \xi_2}(k_{32}-k_{23})(k_{12}-k_{21})e^{-\xi_2(z_0-z)}e^{-4\xi_2 h}\lambda J_0(\lambda\rho)d\lambda$$

The above equations apply when the both the source at $z_0$ and the receiver at z are in the middle bed. Four terms are present when the source and receiver are in different beds, although term one (1) and term four (4) are not constants.

Similarly $\pi_{x2}^{TML}$ (see equation (50)) splits into 4 terms using Q' (see equation (53)).

Of the four terms, term one is the one that is most like a complete log. If only one term were to be computed, it should be term one. It is also useful in computing other terms. For example, if term two in MWD were required it could be computed by computing a log with terms one and two then subtracting term one form the log. This is useful in MWD because phase differences and/or amplitude ratios are measured.

The boundary condition on $(\pi_z^{TM}+\pi_2^{TE})$ (37) may be thought of as a coupling mechanism between $\pi_z^{TM}$ and $\pi_z^{TE}$. The homogeneous solution of equation (21) having cylindrical symmetry about the z-axis is:

$$\pi_{zj}^{TE} = \frac{M_v}{4\pi}\int_0^\infty \frac{S_j(\lambda)e^{-\xi_j(z+h)}}{T_j(\lambda)e^{+\xi_j(z+h)}}\lambda J_0(\lambda\rho)d\lambda \quad (59)$$

Therefore, $\pi_z^{TE}$ in each of the three layers for a VMD is:

$$\pi_{z1}^{TE} = \frac{M_v}{4\pi}\int_0^\infty S_1 e^{-\xi_1(z-h)}\lambda J_0(\lambda\rho)d\lambda, \quad (60)$$

--- h $$\pi_{z2}^{TE} = \frac{M_v}{4\pi}\int_0^\infty (T_2 e^{\xi_2(z-h)}+S_2 e^{-\xi_2(z+h)})\lambda J_0(\lambda\rho)d\lambda, \quad (61)$$

--- -h $$\pi_{z3}^{TE} = \frac{M_v}{4\pi}\int_0^\infty T_3 e^{\xi_3(z+h)}\lambda J_0(\lambda\rho)d\lambda. \quad (62)$$

Substituting equations (39) through (41) and (60) through (62) into boundary conditions (35) and (37), we obtain the solutions for $S_1$, $T_2$, $S_2$ and $T_3$:

$$S_1=[P_{21}\xi_2 H^{+h}+Q_{32}\xi_3 e^{-2\xi_2 h}2\xi_2]/\Delta_v \quad (63)$$

$$T_2=[-P_{21}\xi_1(\xi_2+\xi_3)+Q_{32}\xi_3 e^{-2\xi_2 h}(\xi_2-\xi_1)]/\Delta_v \quad (64)$$

$$S_2=[-P_{21}\xi_1 e^{-2\xi_2 h}(\xi_2-\xi_3)+Q_{32}\xi_3(\xi_2+\xi_1)]/\Delta_v \quad (65)$$

$$T_3=[-P_{21}\xi_1 e^{-2\xi_2 h}2\xi_2-Q_{32}\xi_2 H^{-h}]/\Delta_v \quad (66)$$

where $$H^{+h} = \xi_2+\xi_3-(\xi_2-\xi_3)e^{-4\xi_2 h} \quad (67)$$

$$H^{-h} = \xi_2+\xi_1-(\xi_2-\xi_1)e^{-4\xi_2 h}$$

-continued $$\Delta_v = (\xi_2 + \xi_1)(\xi_2 + \xi_3) - (\xi_2 - \xi_1)(\xi_2 - \xi_3)e^{-4\xi_2 h}$$

$$P_{21} = \left[\frac{\beta_2}{\xi_2}e^{\xi_2(z_0-h)} + Q_2 + P_2 e^{-2\xi_2 h}\right] - \left[\frac{\beta_1}{\xi_1}e^{-\xi_1(z_0-h)} + P_1\right]$$

For the case of the source in the middle or second layer $\beta_2 = 1$:

$$P_{21} = \frac{2P'e^{-2\xi_2 h}}{\Delta_h}(k_1^2 - k_2^2) \tag{68}$$

$$Q_{32} = \left[\frac{\beta_3}{\xi_3}e^{\xi_3(z_0+h)} + Q_3\right] - \left[\frac{\beta_2}{\xi_2}e^{-\xi_2(z_0+h)} + Q_2 e^{-2\xi_2 h} + P_2\right] \tag{69}$$

For the case of the source in the middle or second layer $\beta_2 = 1$:

$$Q_{32} = \frac{2Q'e^{-2\xi_2 h}}{\Delta_h}(k_2^2 - k_3^2) \tag{70}$$

From equations (63) to (66) note that $S_1$, $T_2$, $S_2$ and $T_3$ split into an upper (U) part $S_1^U$, $T_2^U$, $S_2^U$ and $T_3^U$ and a lower (L) part $S_1^L$, $T_2^L$, $S_2^L$ and $T_3^L$. Consequently, $\pi_z^{TE}$ splits into an upper (U) part $\pi_z^{TEU}$ associated with the upper bed boundary at $z=h$ and a lower (L) part $\pi_z^{TEL}$ associated with the lower bed boundary at $z=-h$ such that:

$$\pi_z^{TE} = \pi_z^{TEU} + \pi_z^{TEL}, \tag{71}$$

For the upper (U) part:

$$S_1^U = P_{21}\xi_2 H^{+h}/\Delta_v \tag{72}$$

$$T_2^U = -P_{21}\xi_1(\xi_2+\xi_3)/\Delta_v \tag{73}$$

$$S_2^U = -P_{21}\xi_1 e^{-2\xi_2 h}(\xi_2-\xi_3)/\Delta_v \tag{74}$$

$$T_3^U = -P_{21}\xi_1 e^{-2\xi_2 h} 2\xi_2/\Delta_v \tag{75}$$

from (63) through (66).

The upper (U) part of $\pi_z^{TE}$ is:

$$\pi_{z1}^{TEU} = \frac{M_v}{4\pi}\int_0^\infty \frac{P_{21}}{\Delta_v}\xi_2 H^{+h}e^{-\xi_1(z-h)}\lambda J_0(\lambda\rho)d\lambda \tag{76}$$

---h $$\pi_{z2}^{TEU} = \tag{77}$$
$$\frac{-M_v}{4\pi}\int_0^\infty \frac{P_{21}}{\Delta_v}\xi_1[(\xi_2+\xi_3)e^{\xi_2(z-h)} + (\xi_2-\xi_3)e^{-\xi_2(z-h+4h)}]\lambda J_0(\lambda\rho)d\lambda$$

$$= \frac{-M_v}{4\pi} \tag{78}$$
$$\int_0^\infty \frac{P_{21}}{\Delta_v}e^{-2\xi_2 h}\xi_1[(\xi_2+\xi_3)e^{\xi_2(z+h)} + (\xi_2-\xi_3)e^{-\xi_2(z+h)}]\lambda J_0(\lambda\rho)d\lambda$$

--- -h $$\pi_{z3}^{TEU} = \frac{-M_v}{4\pi}\int_0^\infty \frac{P_{21}}{\Delta_v}e^{-2\xi_2 h}\xi_1 2\xi_2 e^{\xi_3(z+h)}\lambda J_0(\lambda\rho)d\lambda \tag{79}$$

For the case of the source in the middle or second layer, $\beta_2 = 1$ using $P_{21}$ (68) $\pi_z^{TEU}$ becomes:

$$\pi_{z1}^{TEU} = \frac{M_v}{4\pi}(k_1^2 - k_2^2)\int_0^\infty \frac{2P'e^{-2\xi_2 h}}{\Delta_v \Delta_h}\xi_2 H^{+h}e^{-\xi_1(z-h)} \times \lambda J_0(\lambda\rho)d\lambda \tag{6)(80}$$

---h $$\pi_{z2}^{TEU} = \frac{-M_v}{4\pi}(k_1^2 - k_2^2)\int_0^\infty \frac{2P'e^{-2\xi_2 h}}{\Delta_v \Delta_h} \tag{7)(81}$$
$$\xi_1[(\xi_2+\xi_3)e^{-\xi_2(z-h)} + (\xi_2-\xi_3)e^{-\xi_2(z-h+4h)}] \times \lambda J_0(\lambda\rho)d\lambda$$

$$= \frac{-M_v}{4\pi}(k_1^2 - k_2^2)\int_0^\infty \frac{2P'e^{-2\xi_2 h}}{\Delta_v \Delta_h}e^{-2\xi_2 h} \tag{8)(82}$$
$$\xi_1[(\xi_2+\xi_3)e^{\xi_2(z+h)} + (\xi_2-\xi_3)e^{-\xi_2(z+h)}] \times \lambda J_0(\lambda\rho)d\lambda$$

---h $$\pi_{z3}^{TEU} = \tag{9)(83}$$
$$\frac{-M_v}{4\pi}(k_1^2 - k_2^2)\int_0^\infty \frac{2P'e^{-2\xi_2 h}}{\Delta_v \Delta_h}e^{-2\xi_2 h}\xi_1 2\xi_2 e^{-\xi_3(z+h)} \times \lambda J_0(\lambda\rho)d\lambda$$

It is the difference in material properties $k^2 = \omega^2\mu\varepsilon$ (20) $(k_1^2 - k_2^2)$ at $z=h$ that drive the $\pi_z^{TEU}$ part of a VMD. Similarly for $\pi_z^{TEU}$ for a HMD.

Using P' (52) $\pi_{z2}^{TEU}$ (7) and (81) splits into 4 terms $$\pi_{z2}^{TEU} = \pi_{z2}^{TEU1} + \pi_{z2}^{TEU2} + \pi_{z2}^{TEU3} + \pi_{z2}^{TEU4} \tag{84}$$

where, for the case of the source is in the middle or second layer $\beta_2 = 1$:

$$\pi_{z2}^{TEU1} = \frac{-M_v}{4\pi}(k_1^2 - k_2^2) \tag{85}$$
$$\int_0^\infty \frac{2}{\Delta_v \Delta_h}\xi_1(k_{32} + k_{23})(\xi_2+\xi_3)e^{\xi_2(+(z_0-h)+(z-h))}\lambda J_0(\lambda\rho)d\lambda$$

$$\pi_{z2}^{TEU2} = \frac{-M_v}{4\pi}(k_1^2 - k_2^2) \tag{86}$$
$$\int_0^\infty \frac{2}{\Delta_v \Delta_h}\xi_1(k_{32} + k_{23})(\xi_2-\xi_3)e^{+\xi_2(z_0-z)}e^{-4\xi_2 h}\lambda J_0(\lambda\rho)d\lambda$$

$$\pi_{z2}^{TEU3} = \frac{-M_v}{4\pi}(k_1^2 - k_2^2) \tag{87}$$
$$\int_0^\infty \frac{2}{\Delta_v \Delta_h}\xi_1(k_{32} - k_{23})(\xi_2+\xi_3)e^{-\xi_2(z_0-z)}e^{-4\xi_2 h}\lambda J_0(\lambda\rho)d\lambda$$

$$\pi_{z2}^{TEU4} = \frac{-M_v}{4\pi}(k_1^2 - k_2^2)\int_0^\infty \frac{2}{\Delta_v \Delta_h}\xi_1(k_{32} - k_{23}) \tag{88}$$
$$(\xi_2-\xi_3)e^{\xi_2(-(z_0-(-h))-(z-(-h)))}e^{-4\xi_2 h} \times \lambda J_0(\lambda\rho)d\lambda$$

Because of the factor $e^{-4\xi_2 h}$, $\pi_{z2}^{TEU2}$, $\pi_{z2}^{TEU3}$ and $\pi_{z2}^{TEU4}$ are usually small. $\pi_{z2}^{TEU1}$ decreases in the downward direction and is thus designated TE down.

In one possible embodiment, it is best to solve for $\pi_z^{TEU}$ and $\pi_z^{TEL}$ on a bed boundary by bed boundary basis. For example, doing the upper bed boundary at $z=h$ for $\pi_z^{TEU}$. Using the form of (76) through (79) for the upper bed boundary at $z=h$, $\pi_z^{TEU}$ can be expressed as:

$$\pi_{z1}^{TEU} = \frac{M_v}{4\pi}\int_0^\infty S_1^U e^{-\xi_1(z-h)}\lambda J_0(\lambda\rho)d\lambda \tag{89}$$

---h $$\pi_{z2}^{TEU} = \frac{M_v}{4\pi}\int_0^\infty R_2^U[(\xi_2+\xi_3)e^{\xi_2(z-h)} + (\xi_2-\xi_3)e^{-\xi_2(z-h+4h)}]\lambda J_0(\lambda\rho)d\lambda \tag{90}$$

$$= \frac{M_v}{4\pi}\int_0^\infty R_2^U e^{-2\xi_2 h}[(\xi_2+\xi_3)e^{\xi_2(z+h)} + (\xi_2-\xi_3)e^{-\xi_2(z+h)}]\lambda J_0(\lambda\rho)d\lambda \tag{91}$$

-continued

--- −h $$\pi_{z3}^{TEU} = \frac{M_v}{4\pi} \int_0^\infty R_2^U e^{-2\xi_2 h} 2\xi_2 e^{\xi_3(z+h)} \lambda J_0(\lambda\rho) d\lambda \quad (92)$$

Solving for $S_1^U$ and $R_2^U$ using boundary conditions (35) and (37) at z=h:

$$S_1^U = P_{21}\xi_2 H^{+h}/\Delta_v \quad (72)(93)$$

$$R_2^U = -P_{21}\xi_1/\Delta_v \quad (94)$$

which produces results identical to (76) through (79).

For the lower (L) part:

$$S_1^L = Q_{32}\xi_3 e^{-2\xi_2 h} 2\xi_2/\Delta_v \quad (95)$$

$$T_2^L = Q_{32}\xi_3 e^{-2\xi_2 h}(\xi_2 - \xi_1)/\Delta_v \quad (96)$$

$$S_2^L = Q_{32}\xi_3(\xi_2 + \xi_1)/\Delta_v \quad (97)$$

$$T_3^L = -Q_{32}\xi_2 H^{-h}/\Delta_v \quad (98)$$

from (63) through (66) The lower (L) part of $\pi_z^{TE}$ becomes:

$$\pi_{z1}^{TEL} = \frac{M_v}{4\pi} \int_0^\infty \frac{Q_{32}}{\Delta_v} e^{-2\xi_2 h} \xi_3 2\xi_2 e^{-\xi_1(z-h)} \lambda J_0(\lambda\rho) d\lambda \quad (99)$$

--- h $$\pi_{z2}^{TEL} = \frac{M_v}{4\pi} \quad (100)$$

$$\int_0^\infty \frac{Q_{32}}{\Delta_v} e^{-2\xi_2 h} \xi_3 [(\xi_2 + \xi_1)e^{-\xi_2(z-h)} + (\xi_2 - \xi_1)e^{\xi_2(z-h)}] \lambda J_0(\lambda\rho) d\lambda$$

$$= \frac{M_v}{4\pi} \int_0^\infty \frac{Q_{32}}{\Delta_v} \xi_3 [(\xi_2 + \xi_1)e^{-\xi_2(z+h)} + (\xi_2 - \xi_1)e^{\xi_2(z+h-4h)}] \lambda J_0(\lambda\rho) d\lambda \quad (101)$$

--- −h $$= \frac{-M_v}{4\pi} \int_0^\infty \frac{Q_{32}}{\Delta_v} \xi_2 H^{-h} e^{-\xi_3(z+h)} \lambda J_0(\lambda\rho) d\lambda \quad (102)$$

For the case where the source is in the middle or second layer $\beta_2 = 1$, using $Q_{32}$ (70) $\pi_z^{TEL}$ becomes:

$$\pi_{z1}^{TEL} = \quad (10)(103)$$

$$\frac{M_v}{4\pi}(k_2^2 - k_3^2) \int_0^\infty \frac{2Q'e^{-2\xi_2 h}}{\Delta_h \Delta_v} e^{-2\xi_2 h} \xi_3 2\xi_2 e^{-\xi_1(z-h)} \times \lambda J_0(\lambda\rho) d\lambda$$

--- h $$\pi_{z2}^{TEL} = \frac{M_v}{4\pi}(k_2^2 - k_3^2) \int_0^\infty \frac{2Q'e^{-2\xi_2 h}}{\Delta_h \Delta_v} e^{-2\xi_2 h} \quad (11)(104)$$

$$\xi_3[(\xi_2 + \xi_1)e^{-\xi_2(z-h)} + (\xi_2 - \xi_1)e^{\xi_2(z-h)}] \times \lambda J_0(\lambda\rho) d\lambda$$

$$= \frac{M_v}{4\pi}(k_2^2 - k_3^2) \int_0^\infty \frac{2Q'e^{-2\xi_2 h}}{\Delta_h \Delta_v} \quad (12)(105)$$

$$\xi_3[(\xi_2 + \xi_1)e^{-\xi_2(z+h)} + (\xi_2 - \xi_1)e^{\xi_2(z+h-4h)}] \times \lambda J_0(\lambda\rho) d\lambda$$

--- z = −h $$\pi_{z3}^{TEL} = \frac{-M_v}{4\pi}(k_2^2 - k_3^2) \int_0^\infty \frac{2Q'e^{-2\xi_2 h}}{\Delta_h \Delta_v} \xi_2 H^{-h} e^{\xi_3(z+h)} \times \lambda J_0(\lambda\rho) d\lambda \quad (13)(106)$$

It is the difference in material properties $k^2 = \omega^2 \mu\epsilon$ (20) $(k_2^2 - k_3^2)$ between layer 2 and layer 3 at z=−h that drives the $\pi_z^{TEL}$ part of a VMD. Similarly for $\pi_z^{TEL}$ for a HMD.

Using Q' (equation (53)) $\pi_{z2}^{TEL}$ (see equations (12) (105)) splits into 4 terms $$\pi_{z2}^{TEL} = \pi_{z2}^{TEL1} + \pi_{z2}^{TEL2} + \pi_{z2}^{TEL3} + \pi_{z2}^{TEL4} \quad (104)$$

where, for the case of the source is in the middle or second layer $\beta_2 = 1$:

$$\pi_{z2}^{TEL1} = \frac{M_v}{4\pi}(k_2^2 - k_3^2) \quad (108)$$

$$\int_0^\infty \frac{2}{\Delta_v \Delta_h} \xi_3(k_{12} + k_{21})(\xi_2 + \xi_1)e^{-\xi_2((z_0 - (-h)) + (z - (-h)))} \lambda J_0(\lambda\rho) d\lambda$$

$$\pi_{z2}^{TEL2} = \frac{M_v}{4\pi}(k_2^2 - k_3^2) \quad (109)$$

$$\int_0^\infty \frac{2}{\Delta_v \Delta_h} \xi_3(k_{12} + k_{21})(\xi_2 - \xi_1)e^{-\xi_2(z_0 - z)}e^{-4\xi_2 h} \lambda J_0(\lambda\rho) d\lambda$$

$$\pi_{z2}^{TEL3} = \frac{M_v}{4\pi}(k_2^2 - k_3^2) \quad (110)$$

$$\int_0^\infty \frac{2}{\Delta_v \Delta_h} \xi_3(k_{12} - k_{21})(\xi_2 + \xi_1)e^{\xi_2(z_0 - z)}e^{-4\xi_2 h} \lambda J_0(\lambda\rho) d\lambda$$

$$\pi_{z2}^{TEL4} = \frac{M_v}{4\pi}(k_2^2 - k_3^2) \quad (111)$$

$$\int_0^\infty \frac{2}{\Delta_v \Delta_h} \xi_3(k_{12} - k_{21})(\xi_2 - \xi_1)e^{\xi_2((z_0 - h) + (z - h))}e^{-4\xi_2 h} \lambda J_0(\lambda\rho) d\lambda$$

Because of the factor $e^{-4\xi_2 h}$, $\pi_{z2}^{TEL2}$, $\pi_{z2}^{TEL3}$ and $\pi_{z2}^{TEL4}$ are usually small. $\pi_{z2}^{TEL1}$ decreases in the upward direction and is thus designated TE up.

Electromagnetic Fields Due to a Horizontal Magnetic Dipole

For a horizontal magnetic dipole, it is convenient to use both the rectangular and the cylindrical coordinates with the magnetic dipole located at x=0, y=0, or $\rho$=0 and z=$z_0$, pointing in the x direction, as shown in FIG. 14. Although equation (19) might indicate that only $\pi_x^{TM}$ exists for this case, which is not true. In fact, the Hertz potential has a z component as well as an x component $$\pi = \pi_x^{TM}\hat{x} + \pi_z^{TE}\hat{z}. \quad (112)$$

The tangential components of the fields are related to the Hertz potential as:

$$E_x = i\omega\mu \frac{d\pi_z^{TE}}{dy}, \quad (113)$$

and $$E_y = i\omega\mu\left(\frac{d\pi_x^{TM}}{dz} - \frac{d\pi_z^{TE}}{dx}\right), \quad (114)$$

from (17) and $$H_y = \frac{d}{dy}(\nabla \cdot \pi), \quad \text{and} \quad (115)$$

$$H_x = k^2 \pi_x^{TM} + \frac{d}{dx}(\nabla \cdot \pi) \quad (116)$$

from (18).

To ensure continuity of the tangential E and H field components across the bed boundaries at z=±h, the following boundary conditions on the Hertz potential must be satisfied, assuming $\mu_1 = \mu_2 = \mu_3 = \mu$:

from (113)

$$\pi_{zj}^{TE} = \pi_{z(j+1)}^{TE}, \quad (117)$$

from (114) and (117)

$$\frac{d\pi_{xj}^{TM}}{dz} = \frac{d\pi_{x(j+1)}^{TM}}{dz} \quad (118)$$

from (115)

$$\nabla \cdot \pi_j = \nabla \cdot \pi_{j+1}, \quad (119)$$

and from (116) and (119)

$$k_j^2 \pi_{xj}^{TM} = k_{j+1}^2 \pi_{x(j+1)}^{TM}. \quad (120)$$

The Hertz potential $\pi_x^{TM}$ satisfies the inhomogeneous partial differential equation (19) with $M_s = M_h \delta(r-z_0\hat{z})\hat{x}$. Accordingly, $\pi_x^{TM}$ can be expressed as:

$$\pi_{x1}^{TM} = \frac{M_h}{4\pi} \int_0^\infty \left[\frac{\beta_1}{\xi_1} e^{-\xi_1|z-z_0|} + P_1 e^{-\xi_1(z-h)}\right] \lambda J_0(\lambda\rho) d\lambda, \quad (121)$$

--- h $$\pi_{x2}^{TM} = \frac{M_h}{4\pi} \int_0^\infty \left[\frac{\beta_2}{\xi_2} e^{-\xi_2|z-z_0|} + Q_2 e^{\xi_2(z-h)} + P_2 e^{-\xi_2(z+h)}\right] \lambda J_0(\lambda\rho) d\lambda, \quad (122)$$

--- − h $$\pi_{x3}^{TM} = \frac{M_h}{4\pi} \int_0^\infty \left[\frac{\beta_3}{\xi_3} e^{-\xi_3|z-z_0|} + Q_3 e^{\xi_3(z+h)}\right] \lambda J_0(\lambda\rho) d\lambda. \quad (123)$$

$P_1$, $Q_2$, $P_2$, $Q_3$ (42) through (45) are from boundary conditions (120) and (118).

$\pi_x^{TM}$ alone cannot satisfy the boundary condition on $\nabla \cdot \pi$, (119). This boundary condition may be thought of as a coupling mechanism between $\pi_x^{TM}$ and $\pi_z^{TE}$ (112). $\pi_z^{TE}$ in each of the three layers is:

$$\pi_{z1}^{TE} = \frac{M_h}{4\pi} \cos\phi \int_0^\infty S_1 e^{-\xi_1(z-h)} \lambda J_1(\lambda\rho) d\lambda, \quad (124)$$

--- h $$\pi_{z2}^{TE} = \frac{M_h}{4\pi} \cos\phi \int_0^\infty (T_2 e^{\xi_2(z-h)} + S_2 e^{-\xi_2(z+h)}) \lambda J_1(\lambda\rho) d\lambda, \quad (125)$$

--- − h $$\pi_{z3}^{TE} = \frac{M_h}{4\pi} \cos\phi \int T_3 e^{\xi_3(z+h)} \lambda J_1(\lambda\rho) d\lambda. \quad (126)$$

Substituting equations (121) through (123) and (124) through (126) into boundary conditions (117) and (119), we obtain the solutions for $S_1$, $T_2$, $S_2$ and $T_3$ $$S_1 = [P_{21} B^{+h} + Q_{32} e^{-2\xi_2 h} 2\xi_2]\lambda/\Delta_v \quad (127)$$

$$T_2 = [P_{21}(\xi_2+\xi_3) + Q_{32} e^{-2\xi_2 h}(\xi_2-\xi_1)]\lambda/\Delta_v \quad (128)$$

$$S_2 = [P_{21} e^{-2\xi_2 h}(\xi_2-\xi_3) + Q_{32}(\xi_2+\xi_1)]\lambda/\Delta_v \quad (129)$$

$$T_3 = [P_{21} e^{-2\xi_2 h} 2\xi_2 + Q_{32} B^{-h}]\lambda/\Delta_v \quad (130)$$

where $$B^{+h} = \xi_2 + \xi_3 + (\xi_2-\xi_3)e^{-4\xi_2 h} \quad (131)$$

and $$B^{-h} = \xi_2 + \xi_1 + (\xi_2-\xi_1)e^{-4\xi_2 h}. \quad (132)$$

From equations (127) to (130), it is noted that $S_1$, $T_2$, $S_2$ and $T_3$ split into an upper (U) part $S_1^U$, $T_2^U$, $S_2^U$ and $T_3^U$ and a lower (L) part $S_1^L$, $T_2^L$, $S_2^L$ and $T_3^L$. Consequently, $\pi_z^{TE}$ splits into an upper (U) part $\pi_z^{TEU}$ associated with the upper bed boundary at z=11 and a lower (L) part $\pi_z^{TEL}$ associated with the lower bed boundary at z=−h such that:

$$\pi_z^{TE} = \pi_z^{TEU} + \pi_z^{TEL}. \quad (133)$$

Very similar to (71) for a VMD.

The boundary conditions for a Vertical Electric Dipole are (See Sommerfeld 1949 hereinbefore):

$$k_j^2 \pi_{zj} = k_{(j+1)}^2 \pi_{z(j+1)} \quad (134)$$

$$\frac{d\pi_{zj}}{dz} = \frac{d\pi_{z(j+1)}}{dz} \quad (135)$$

The above boundary conditions can be written as:

$$\pi_{zj}^{TE} = \pi_{z(j+1)}^{TE} \quad (136)$$

$$\frac{d\pi_{zj}^{TE}}{dz} = \frac{d\pi_{z(j+1)}^{TE}}{dz} \quad (137)$$

$$k_j^2(\pi_j^{TE} + \pi_j^{TM}) = k_{(j+1)}^2(\pi_{(j+1)}^{TE} + \pi_{(j+1)}^{TM}) \quad (138)$$

$$\frac{d\pi_{zj}^{TM}}{dz} = \frac{d\pi_{z(j+1)}^{TM}}{dz} \quad (139)$$

(138) is equivalent to (134) and (137) plus (139) is equivalent to (135) using $\pi_z = \pi_z^{TE} + \pi_z^{TM}$.

For completeness, the boundary conditions for a Horizontal Electric Dipole are:

$$k_j^2 \pi_{x(j)}^{TE} = k_{(j+1)}^2 \pi_{x(j+1)}^{TE} \quad (140)$$

$$k_j^2 \frac{d\pi_{xj}^{TE}}{dz} = k_{(j+1)}^2 \frac{d\pi_{x(j+1)}^{TE}}{dz} \quad (141)$$

$$k_j^2 \pi_{z(j)}^{TM} = k_{(j+1)}^2 \pi_{z(j+1)}^{TM} \quad (142)$$

$$\nabla \cdot \pi = \nabla \cdot \pi \quad (143)$$

While the invention has been described in terms of components of various methods, individual components or various groups of components of the methods described hereinbefore can be utilized. For example, in one embodiment, it may be useful to utilize transverse magnetic term one by itself. Alternatively, it may be useful to determine selected terms for particular boundaries. Other examples are provided above and in the claims. The invention can be implemented by first determining what happens at the boundaries. Alternatively, the invention may first calculate a log for each layer. Combinations of these approaches may also be utilized.

While the invention has been described in terms of methods, it will be appreciated that the methods may be utilized within devices, whereby the invention also describes physical devices. Thus, the present invention may be embodied as a machine or system for producing logs. Raw or transformed electrical signals detected by the system are transformed to describe material properties of beds, bed boundary orientations and positions, which may not be apparent or may be inaccurate when simply viewing the electrical signals. It is well known that material properties of beds, bed boundary orientations and positions often have inaccuracies at the bed boundaries. For example, instead of a claim to a method, the present invention might also be described and claimed, referring to claims hereinafter, as a system making a log of material properties in a plurality of beds from an instrument which produces an electromagnetic field, wherein the system comprises one or more electronic components programmed for estimating material properties for said plurality of beds, estimating positions for a plurality of bed boundaries, estimating orientations for said plurality of bed boundaries wherein said bed boundary orientations are individually variable, and utilizing said positions, said orientations, and said material properties to compute said log.

As well, the invention may comprise software which may be stored on a storage medium and utilized in a computer memory, and/or implemented as a series of instructions, depending on the programming language utilized. For example, the invention may be implemented in Fortran or many other suitable computer languages.

As discussed above, it is noted once again that transverse electric down or transverse electric up is not the same as transverse electric terms one, two, three or four.

While the present invention is described in terms of a geological layered environment and electromagnetic tools, the invention may also be utilized for other purposes, e.g., medical purposes such as acoustic analysis of a human body, seismic analysis, or other tools and layered environments. The wave equations are useful for acoustic wave analysis, utilizing higher and/or lower frequencies, and the like within other layered environments.

Accordingly, the foregoing disclosure and description of the invention is illustrative and explanatory thereof, and it will be appreciated by those skilled in the art, that various changes in the ordering of steps, ranges, and/or attributes and parameters related to the steps and/or materials, as well as in the details of the illustrations or combinations of features of the methods discussed herein, may be made without departing from the spirit of the invention. Thus, while the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

What is claimed is:

1. A method, comprising:
    receiving data, produced from at least one instrument, representing a plurality of beds in a geologic formation relative to position in a well bore;
    estimating, from the data, positions within the geologic formation of two bed boundaries traversed by the well bore;
    estimating, from the data, orientations of the two bed boundaries traversed by the well bore, wherein said estimated orientations are free to be non-parallel relative to one another, and wherein estimating the orientations comprises using a processor to, for each given bed boundary of the two bed boundaries,
        generate a model representing expected change in electromagnetic properties to be produced by the at least one instrument as it traverses the given bed boundary, wherein the model is dependent on apparent orientation of the given bed boundary such that the apparent orientation changes as the model changes, and
        fit the model to the data by changing an initial apparent orientation of the given bed boundary, including at least one of dipping angle or direction of dip, until the model approximates a portion of the data corresponding to estimated position for the given bed boundary, to thereby obtain a fitted model; and
    computing a physical property of a given bed of the plurality of beds in the geologic formation, wherein the given bed is between the two bed boundaries, in a manner dependent on the fitted models; wherein the physical property comprises at least one of conductivity or resistivity of the given bed.

2. The method of claim 1, wherein the physical property is conductivity of the given bed.

3. The method of claim 1, wherein the physical property is resistivity of the given bed.

4. The method of claim 1, wherein receiving data includes receiving a measured log that varies as a function of position within the well bore, and wherein estimating the positions comprises:
    identifying positions within the well bore corresponding to variations in the measured log; and
    estimating the positions of the two bed boundaries dependent on the positions within the well bore where the variations are experienced.

5. The method of claim 1, wherein:
    the method further comprises, for a given one of the bed boundaries, identifying a measure of a vertical magnetic dipole (VMD) response and a measure of a horizontal magnetic dipole (HMD) response;
    adjusting the model in a manner which simulates variation in the apparent orientation comprises combining the measure of the VMD response with the measure of the HMD response to obtain a combined result; and
    using the at least one processor to fit the model to the data further comprises
        simulating variation in the apparent orientation for the given bed boundary by varying relative contribution of the measure of the VMD response and the measure of the HMD response in the combined result, and fitting the combined result to the measured log to obtain the fitted model for the given bed boundary, and
        selecting a specific apparent orientation dependent on the relative contribution of the measure of the VMD response and the measure of the HMD response associated with the fitted model for the given bed boundary.

6. The method of claim 1, wherein:
    the method further comprises, for at least one of the two bed boundaries, identifying a vertical magnetic dipole (VMD) measure and a horizontal magnetic dipole (HMD) measure;
    the model is dependent on a variable combination of the VMD measure and the HMD measure; and
    using the at least one processor to fit the model to the data comprises adjusting the variable combination of the VMD measure and the HMD measure, in a manner representing variation of apparent orientation.

7. The method of claim 1, wherein using the at least one processor to fit the model to the data comprises:

adjusting at least one of conductivity or resistivity of a bed adjacent to the given bed boundary.

8. The method of claim 1, wherein the data is computer-readable and receiving the data comprises receiving the data electronically.

9. The method of claim 5, wherein combining comprises summing the measure of the VMD response with the measure of the HMD response to obtain the combined result.

10. The method of claim 5, wherein the measure of the VMD response comprises a transverse electric component of the VMD response and the measure of the HMD response comprises a transverse electric component of the HMD response.

11. The method of claim 5, wherein the measure of the VMD response comprises a transverse magnetic component of the VMD response and the measure of the HMD response comprises a transverse magnetic component of the HMD response.

12. The method of claim 7, wherein:
adjusting the at least one of conductivity or resistivity further comprises adjusting the at least one of conductivity or resistivity for each of two beds adjacent the given bed boundary.

13. The method of claim 8, wherein the instrument is an induction sonde and wherein the data represents a measured log representing at least one of conductivity or resistivity as a function of well depth.

14. An apparatus comprising:
means for receiving data, produced from at least one instrument, representing a plurality of beds in a geologic formation relative to position in a well bore;
means for estimating, from the data, positions within the geologic formation of two bed boundaries traversed by the well bore;
means for estimating, from the data, orientations of the two bed boundaries traversed by the well bore, wherein said estimated orientations are free to be non-parallel relative to one another, and wherein said means for estimating comprises means for, for each given bed boundary of the two bed boundaries,
generating a model representing expected change in electromagnetic properties to be produced by the at least one instrument as it traverses the given bed boundary, wherein the model is dependent on apparent orientation of the given bed boundary such that the apparent orientation changes as the model changes, and
fitting the model to the data by changing an initial apparent orientation of the given bed boundary, including at least one of dipping angle or direction of dip, until the model approximates a portion of the data corresponding to estimated position for the given bed boundary, to thereby obtain a fitted model; and
means for computing a physical property of a given bed of the plurality of beds in the geologic formation, wherein the given bed is between the two bed boundaries, in a manner dependent on the fitted models;
wherein the physical property comprises at least one of conductivity or resistivity of the given bed.

15. An apparatus comprising instructions stored on non-transitory machine-readable media, the instructions when executed to cause at least one processor to:
receive data, produced from at least one instrument, representing a plurality of beds in a geologic formation relative to position in a well bore;
estimate, from the data, positions within the geologic formation of two bed boundaries traversed by the well bore;
estimate, from the data, orientations of the two bed boundaries traversed by the well bore, wherein said estimated orientations are free to be non-parallel relative to one another, wherein the instruction are to further cause the at least one processor to, for each given bed boundary of the two bed boundaries,
generate a model representing expected change in electromagnetic properties to be produced by the at least one instrument as it traverses the given bed boundary, wherein the model is dependent on apparent orientation of the given bed boundary such that the apparent orientation changes as the model changes, and
fit the model to the data by changing an initial apparent orientation of the given bed boundary, including at least one of dipping angle or direction of dip, until the model approximates a portion of the data corresponding to estimated position for the given bed boundary, to thereby obtain a fitted model; and
compute a physical property of a given bed of the plurality of beds in the geologic formation, wherein the given bed is between the two bed boundaries, in a manner dependent on the fitted models;
wherein the physical property comprises at least one of conductivity or resistivity.

16. The apparatus of claim 15, wherein the physical property is conductivity of the given bed.

17. The apparatus of claim 15, wherein the physical property is resistivity of the given bed.

18. The apparatus of claim 15, wherein the instructions when executed are to cause the at least one processor to receive a measured log that varies as a function of position within the well bore, and to:
identify positions within the well bore where variations in the measured log are experienced; and
estimate the positions of the two bed boundaries dependent on the positions where the variations in the measured log are experienced.

19. The apparatus of claim 15, wherein the instructions when executed are to cause the at least one processor to:
identify a measure of a vertical magnetic dipole (VMD) response and a measure of a horizontal magnetic dipole (HMD) response;
combine the measure of the VMD response with the measure of the HMD response to obtain a combined result;
simulate variation in the apparent orientation by varying relative contribution of the measure of the VMD response and the measure of the HMD response in the combined result, and fitting the combined result to the measured log to obtain the fitted model for the given bed boundary; and
select a specific apparent orientation for the given bed boundary dependent on the relative contribution of the measure of the VMD response and the measure of the HMD response associated with the fitted model for the given bed boundary.

20. The apparatus of claim 15, wherein:
the instructions when executed are to cause the at least one processor to, for at least one of the two bed boundaries, identify a vertical magnetic dipole (VMD) measure and a horizontal magnetic dipole (HMD) measure;

the model is dependent on a variable combination of the VMD measure and the HMD measure; and the instructions when executed are to cause the at least one processor to, for at least one of the two bed boundaries, fit the model to the data by adjusting the variable combination of the VMD measure and the HMD measure, in a manner representing variation of the apparent orientation.

21. The apparatus of claim 15, wherein the instructions when executed are to cause the at least one processor to fit the model to the data by:

adjusting at least one of conductivity or resistivity of a bed adjacent to the given bed boundary.

22. The apparatus of claim 15, wherein the data is computer-readable and the instructions when executed are to cause the at least one processor to receive the data electronically.

23. The apparatus of claim 19, wherein the instructions when executed are to cause the at least one processor to sum the measure of the VMD response with the measure of the HMD response to obtain the combined result.

24. The apparatus of claim 19, wherein the measure of the VMD response comprises a transverse electric component of the VMD response and the measure of the HMD response comprises a transverse electric component of the HMD response.

25. The apparatus of claim 19, wherein the measure of the VMD response comprises a transverse magnetic component of the VMD response and the measure of the HMD response comprises a transverse magnetic component of the HMD response.

26. The apparatus of claim 21, wherein the instructions when executed are to cause the at least one processor to:

adjust at least one of conductivity or resistivity for each of two beds adjacent the given bed boundary.

27. The apparatus of claim 22, wherein the instrument is an induction sonde and wherein the data represents a measured log representing at least one of conductivity or resistivity as a function of well depth.

* * * * *